United States Patent
Bath et al.

(10) Patent No.: US 12,197,968 B1
(45) Date of Patent: Jan. 14, 2025

(54) INGEST PREVIEW OF EVENTS IN A NETWORK COMPUTING ENVIRONMENT

(71) Applicant: Splunk Inc., San Francisco, CA (US)

(72) Inventors: Amritpal Singh Bath, Alamo, CA (US); Samat Jain, San Francisco, CA (US); Isabelle Park, Glendale, CA (US); Vishal Patel, San Francisco, CA (US); Siegfried Puchbauer, San Francisco, CA (US); Tingjin Xu, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/875,172

(22) Filed: Jul. 27, 2022

Related U.S. Application Data

(60) Provisional application No. 63/350,825, filed on Jun. 9, 2022.

(51) Int. Cl.
  *G06F 15/16* (2006.01)
  *G06F 9/54* (2006.01)
  *G06F 16/26* (2019.01)
  *G06F 16/28* (2019.01)

(52) U.S. Cl.
  CPC .............. *G06F 9/542* (2013.01); *G06F 16/26* (2019.01); *G06F 16/288* (2019.01)

(58) Field of Classification Search
  CPC ......... G06F 9/542; G06F 16/26; G06F 16/288
  USPC ........................................................ 709/231
  See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,484,511 B2* | 7/2013 | Tidwell | H04N 21/6582 709/224 |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,537,811 B2* | 1/2017 | Allen | G06F 40/169 |
| 9,755,889 B2* | 9/2017 | Griswold | H04L 41/069 |
| 10,127,258 B2 | 11/2018 | Lamas et al. | |
| 10,171,486 B2* | 1/2019 | Bank | H04L 63/1433 |
| 11,089,064 B1* | 8/2021 | Sarukkai | H04L 41/0894 |

(Continued)

OTHER PUBLICATIONS

Splunk Enterprise 8.0.0 Overview, available online, retrieved May 20, 2020 from docs.splunk.com.

(Continued)

*Primary Examiner* — Thuong Nguyen
(74) *Attorney, Agent, or Firm* — Lathrop GPM LLP

(57) ABSTRACT

A computing device receives an ingest preview request to preview events to be stored by at least one indexer. Responsive to the ingest preview request, the computing device sends a subscription request to the forwarders. The forwarders receive the subscription request and intercept the events that are being sent to at least one of the indexers. The forwarders then clone matching events to the subscription request and responds to the computing device with the matching events. When the computing device receives the matching events, the computing device adds the matching events to a dispatch directory. The user interface is then populated with events in the dispatch directory.

20 Claims, 13 Drawing Sheets

(56) References Cited

U.S. PATENT DOCUMENTS

| | | | |
|---|---|---|---|
| 11,487,708 B1* | 11/2022 | Dangi | G06F 16/156 |
| 2004/0019593 A1* | 1/2004 | Borthwick | G06F 16/24578 |
| 2004/0161796 A1* | 8/2004 | Gustafsson | G16B 35/00 |
| | | | 435/7.1 |
| 2005/0086255 A1* | 4/2005 | Schran | G06F 11/3476 |
| | | | 714/E11.193 |
| 2008/0244008 A1* | 10/2008 | Wilkinson | H04L 67/56 |
| | | | 709/205 |
| 2012/0191856 A1* | 7/2012 | Chen | H04L 67/55 |
| | | | 709/226 |
| 2014/0106704 A1* | 4/2014 | Cooke | H04W 4/16 |
| | | | 455/405 |
| 2014/0258285 A1* | 9/2014 | Lavine | G06F 16/29 |
| | | | 707/728 |
| 2015/0104147 A1* | 4/2015 | Kosaka | G06F 16/738 |
| | | | 386/239 |
| 2016/0004733 A1* | 1/2016 | Cao | G06F 11/0709 |
| | | | 707/755 |
| 2016/0112440 A1* | 4/2016 | Kolton | H04L 69/16 |
| | | | 726/1 |
| 2016/0224570 A1* | 8/2016 | Sharp | G06F 16/113 |
| 2017/0090975 A1* | 3/2017 | Baracaldo Angel | G06F 9/46 |
| 2017/0308596 A1* | 10/2017 | Chen | G06Q 30/0601 |
| 2018/0314393 A1* | 11/2018 | Filippi | G06F 16/345 |
| 2018/0336072 A1* | 11/2018 | Guha | G06F 16/116 |
| 2019/0095531 A1* | 3/2019 | Zhang | G06F 16/9535 |
| 2019/0098106 A1 | 3/2019 | Mungel et al. | |
| 2019/0207969 A1* | 7/2019 | Brown | G06F 21/552 |
| 2020/0167446 A1* | 5/2020 | Azulay | G06F 21/554 |
| 2020/0201818 A1* | 6/2020 | Khajuria | G06F 16/176 |
| 2021/0129325 A1* | 5/2021 | Yu | G05B 19/4155 |
| 2021/0227027 A1* | 7/2021 | Rasmussen | H04L 69/03 |
| 2021/0326452 A1* | 10/2021 | Diehl | G06F 21/60 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carasso, David, "Exploring Splunk" published by CITO Research, New York, NY, Apr. 2012 (156 pages).

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

\* cited by examiner

INGEST PREVIEW OF EVENTS IN A NETWORK COMPUTING ENVIRONMENT

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Modern enterprise systems often comprise thousands of hosts that operate collectively to service requests from even larger numbers of remote clients. During operation, components of these enterprise systems can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

In order to use the volumes of machine-generated data, the machine-generated data is transmitted from the components that produce the data to a data intake and query system. For example, a large number of forwarders may obtain the data from respective data sources and forward the data to indexers that store the data.

BRIEF DESCRIPTION OF THE DRAWINGS

Illustrative examples are described in detail below with reference to the following figures:

FIG. 7 illustrates an example user interface.

FIG. 8 illustrates an example user interface transitioned from FIG. 7.

FIG. 9 illustrates an example user interface transitioned from FIG. 8.

DETAILED DESCRIPTION

Components of enterprise systems can produce significant volumes of machine-generated data in the form of events. An event is a discrete portion of machine data that is associated with a timestamp. The events are transmitted by forwarders to indexers where the events are stored. Once stored, the events may be queried for performing analytics on the data center. Large volumes of events are generated and stored. Thus, it would be impractical for a single user to review each event prior to storage. However, large volumes of machine-generated data also use vast amounts of network computing resources, in terms of network bandwidth, processor, and storage. Further, it would be helpful to be able to transform data to redact data to be stored. Thus, it is useful to store only a portion of each event and/or to store only a subset of events. Accordingly, it would be useful to be able to preview the events prior to storage in real time so that the configuration of the network computer environment may be adjusted.

The disclosed technology is directed to real time ingest preview of events being stored. For example, rather than waiting for the events to be transmitted to the indexers for storage in order to determine what is stored, the disclosed technology provides a subscription mechanism on the forwarders. The subscription request is transmitted virtually instantaneously to the forwarders to allow for immediate preview of events. A computing device of the network computer environment can send a subscription request requesting the preview of events from the forwarders using the subscription mechanism. The computing device can transmit the subscription request to multiple forwarders. The forwarders intercept and clone the events matching the subscription request. The cloned events are transmitted to the computing device, where the cloned events from multiple forwarders are combined and used to populate a user interface. Concurrently, the forwarders continue to forward the events to the indexers.

Figure 1:
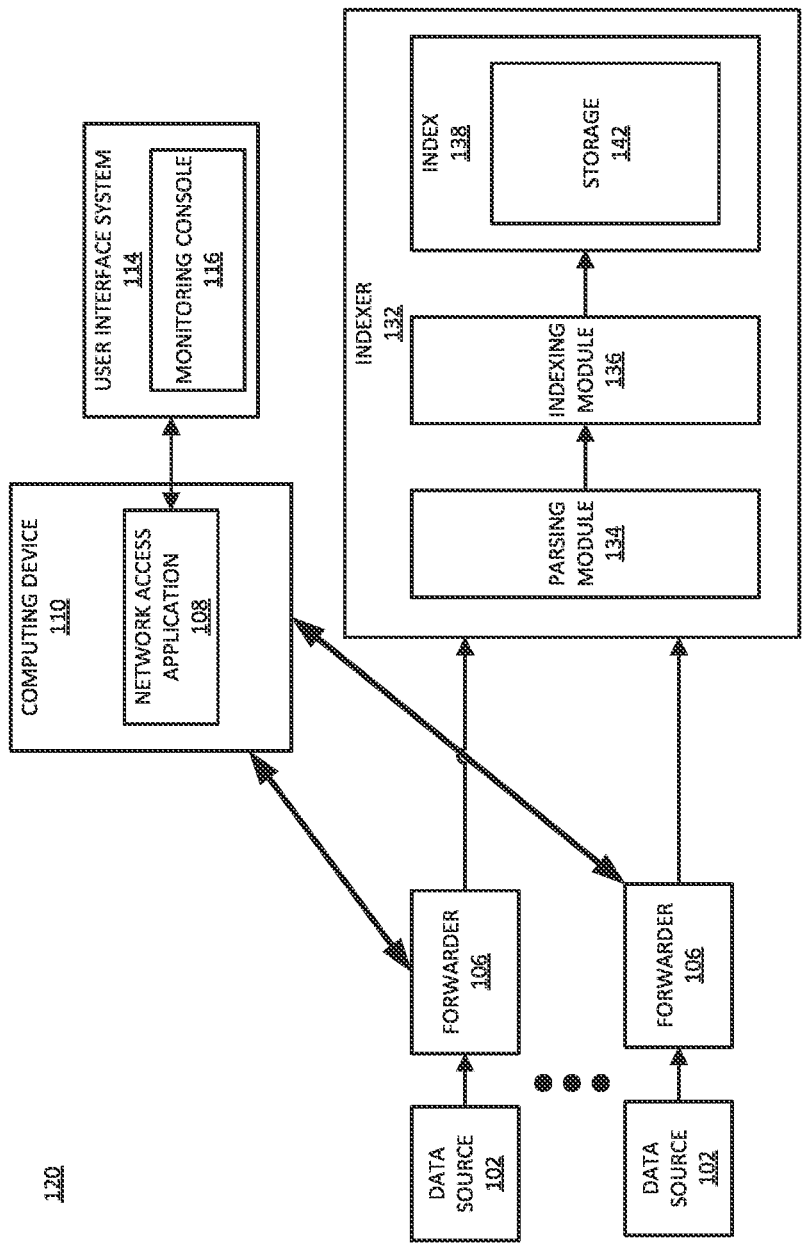
FIG. 1 illustrates an example diagram of a network computer environment.

FIG. 1 illustrates an example diagram of a network computer environment 120. As shown in FIG. 1, the network computer environment 120 includes data sources 102 connected to forwarders 106, which are communicatively connected to at least one indexer 132, such as via a private and/or public network. A computing device 110 is connected to the forwarders and has a corresponding connected user interface system. When the network computer environment is a data intake and query system, the data source 102, forwarder 106 and indexer 132 are described below in reference to FIGS. 10-13.

Briefly, the indexer 132 includes a parsing module 134, an indexing module 136, and an index 138 that includes storage 142. The parsing module 134 is configured to parse events and the indexing module 136 is configured to index the parsed events. The index 138 includes storage 142. Storage 142 stores the events for querying and performing analytics. A data source 102 is a component of a target system that produces machine data for ingesting by the indexer 132. The target system is the computing system, such as an enterprise system, which is being monitored. One or more forwarders 106 are connected to the data sources 102. The forwarders 106 forward data to the indexers 132. Thus, the forwarder 106 provides a connection layer between the data source 102 and the indexer 132, such that the data source 102 does not need to be aware of the existence of the indexer 132.

The forwarders 106 are each connected to computing device 110. The computing device 110 includes a network access application 108. The network access application 108 is configured to send subscription request to the forwarders 106 and receive events from the forwarders. The computing device 110 may be a deployment server that is configured to manage the configuration of the forwarders 106. For example, the computing device 110 may be configured to monitor the forwarders 106, add new forwarders 106, perform orchestration operations, set configuration parameters of the forwarders 106, and perform other management operations of the forwarders.

The computing device 110 is connected to a user interface system 114. The user interface system 114 is configured to interface with a user to provided information to the user. For example, the user interface system 114 may be a web server, web application, or local application by which the network computer environment may be monitored.

Figure 2:
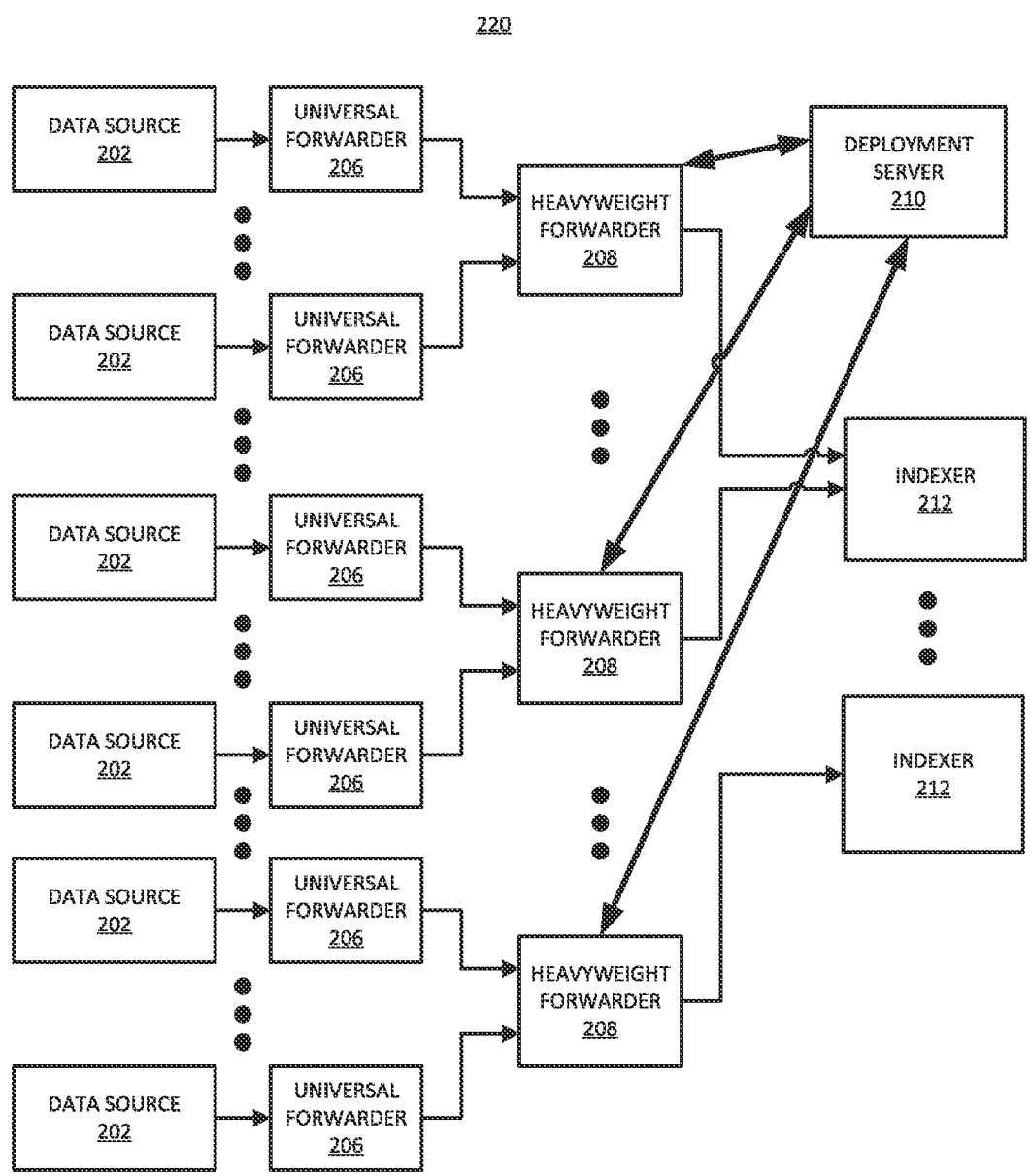
FIG. 2 illustrates an example diagram of a particular system organization.

Different system organizations of data sources 102, forwarders 106, and indexers 132 may exist. For example, FIG. 2 illustrates an example diagram of a particular system organization 220. A data source 202 may correspond to each log file or repository of events by each component of the target system. For example, in an enterprise system, separate data sources may exist for each web server, firewall, security application and other component being monitored. Thus, in a single system, thousands to hundreds of thousands of data sources 202 may exist. Each data source may be a log, database, or other type of component that provides data. Data sources 202 may be connected to a universal forwarder 206. The universal forwarder 206 may be a local executing process that is on the same computer or device as the data source 202. In some implementations, the only action performed on the events by the universal forwarder 206 is to forward the events to a heavyweight forwarder 208. For example, the universal forwarder 206 may not index, search data, or parse events. Although FIG. 2 shows a one to one mapping between data sources 202 and universal forwarders 206, multiple data sources 202 may be connected to the same universal forwarder.

In the organization shown in FIG. 2, each universal forwarder 206 is connected to a heavyweight forwarder 208. In addition to having the functionality of a universal forwarder 206, the heavyweight forwarder 208 can perform additional actions including parsing the events. For example, the heavyweight forwarder 208 may perform filtering operations, regular expression (REGEX) processing, initial or partial indexing operations, and other processing. The heavyweight forwarder 208 may include functionality to parse events and filter events satisfying certain criteria or portions of events.

Regardless of whether the forwarder is a universal forwarder 206 or heavyweight forwarder 208, the forwarder's primary function is to forward the events. With the exception of temporary queues, caches, registers, and other temporary and volatile storage for data, the forwarder does not store the events. Further, the forwarders may be located on a different physical device than the indexer 212 that stores the events. The deployment server 210 is an example of the computing device 110 shown in FIG. 1. In some implementations, the deployment server 210 is configured to transmit subscription requests responsive to ingest preview requests. The deployment server 210 is further configured to populate an interface with events received responsive to the subscription request. Based on the ingest preview of events, new configuration parameters of the system may be defined. The deployment server 210 is configured to implement the new configuration of parameters. For example, the deployment server 210 may update the configurations of each of the heavyweight forwarders 208.

FIG. 2 is only one of the example organizations of the system. For example, rather than universal forwarders connected to the data sources, a heavyweight forwarder may be directly connected to the data sources. The heavyweight forwarder connected to the data sources may in turn be connected to another heavyweight forwarder which is connected to the indexer or another heavyweight forwarder. Multiple tiers of forwarders may exist in virtually any configuration. As another example, one or more of the data sources may be a centralized storage, such as a database or KAFKA bus on a target system that obtains data from multiple logs. In many implementations, the deployment server and the forwarders are located on the target system, such as behind a firewall. The indexer may be external to the target system, such as by being a cloud service. In some on premises implementations, the indexer is also located on the target system.

Figure 3:
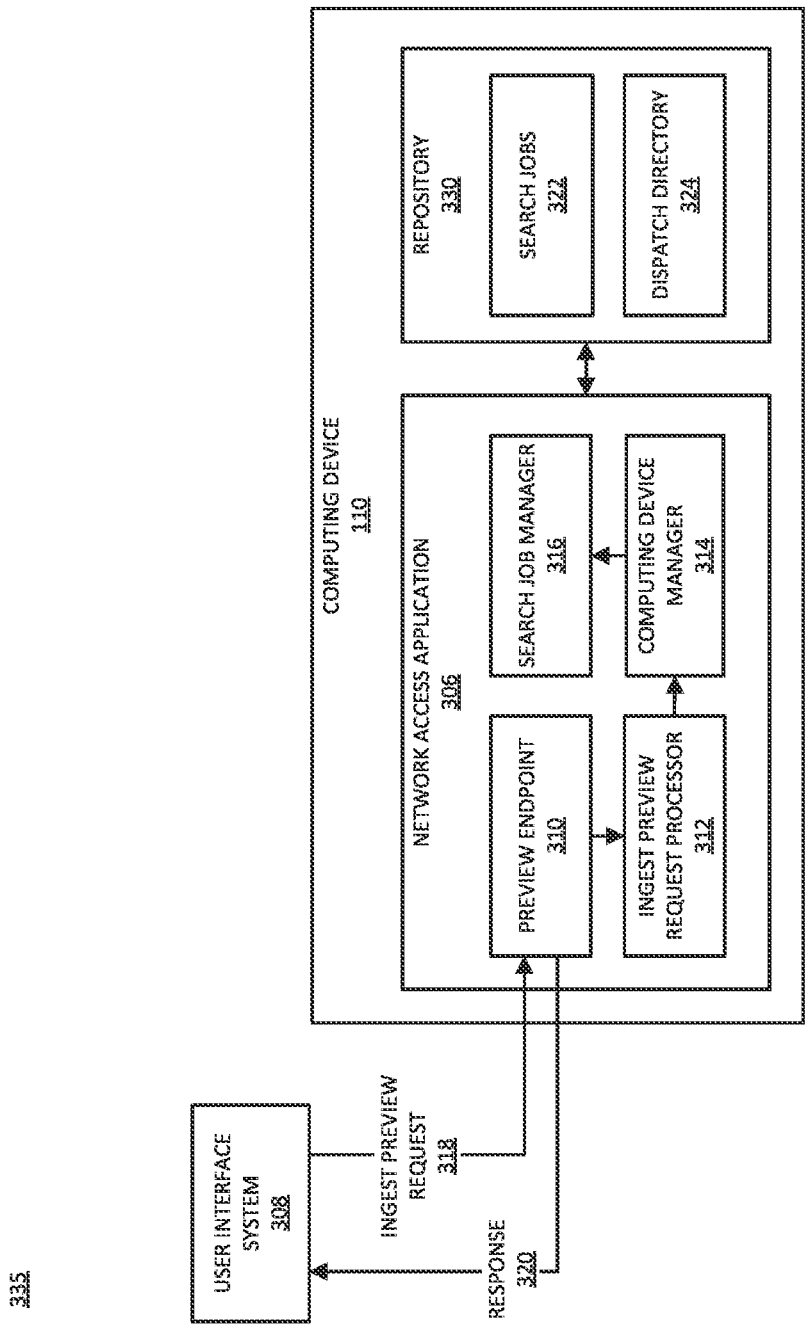
FIG. 3 illustrates an example diagram of a computing device.

FIG. 3 illustrates an example diagram 335 of a computing device 110 for processing ingest preview requests. As shown in FIG. 3, the computing device 110 is connected to the user interface system 308. The user interface system 308 may be on the same physical or virtual device, or a separate physical or virtual device, as the computing device 110. For example, the user interface system 308 may be a front-end process and the computing device 110 may be a back-end process.

The computing device 110 is configured to receive, via a preview endpoint 310, an ingest preview request 318 from the user interface system 308 and is configured to transmit a response 320 to the user interface system. The preview endpoint 310 is an end of a communication channel. The ingest preview request 318 is a request from the user interface system to preview events. The ingest preview request 318 may include request parameters. The request parameters may constrain the events and/or portions of events that are returned in response to the ingest preview request. For example, the ingest preview request may include an expected output format, one or more event criteria, and a number of events to be returned. For example, the event criteria may be a source type specifying a type of data source or a type of component of the target system from which events are generated, field values of matching events, and other criteria of the matching events that should be returned.

By way of an example, the ingest preview request is a representational state transfer (REST) application programming interface (API) call to the preview endpoint 310 of the network access application 306. The REST API call uses GET, PUT, POST, and DELETE to read, update, create, and delete data, respectively.

For example, the REST API call for the ingest preview request may be of the following form:

GET    "/services/data/ingest/ds-event-capture?output_mode=json&sourcetype=main&num_of_events=100"

In the above example, the REST API call is a GET request for ingest preview from the endpoint 310 of the network access application 306. The REST API call includes request parameters requesting that the returned format of events is in JavaScript Object Notation (JSON), the source type of matching data source is main, and the maximum number of events to return is one hundred.

Responsive to the ingest preview request, the endpoint 310 provides the response 320 that includes a type identifier and a job identifier to the user interface system 308. The type identifier identifies a type of request. The job identifier is a unique identifier of the ingest preview job. In one or more implementations, the job identifier may be used by the user interface system to check on the status of the job and retrieve a result.

For example, the response 320 may be:

{"messages": [{"type":
      "INFO",
      "text": "1643663523.4"

The user interface system 308 may use the job identifier of "1643663523.4" to check the status and retrieve the events. For example, the user interface system 308 may send a subsequent loadjob request with the job identifier.

Continuing with FIG. 3, the preview endpoint 310 is connected to an ingest preview request processor 312. The ingest preview request processor 312 is configured to integrate with the computing device manager 314 on the network access application 306. The computing device manager 314 is configured to send subscription requests to the forwarders. The computing device manager 314 is further configured to obtain streaming events from the forwarders and write the streaming events to the dispatch directory 324. The dispatch directory 324 is a temporary storage of events.

The computing device manager 314 may process the ingest preview request as a search job although the job is not a conventional search job. A conventional search job identifies each event matching a set of criteria while an ingest preview returns only a portion of events until a stop condition occurs. The stop condition may be, for example, a timeout and/or an event count of the number of events satisfying a threshold. Further, the computing device manager may stop connections with the forwarders when at least one of the stop conditions is satisfied.

In such implementations, the computing device manager 314 may communicate with a search job manager 316. The search job manager 316 is configured to create a search job 322 for the ingest preview request. The search job 322 is a tracking and scheduling mechanism for searches. For example, by setting the job as a search job, native functionality of the search job manager 316 is used for the management of the ingest preview request. The native functionality may allocate resources, create a dispatch directory 324 for the search job, schedule transmission of the subscription requests, and perform time to live (TTL) operations for the ingest preview request. The search job manager 316 further generates a dispatch directory 324 for each search job 322. The dispatch directory 324 is a storage mechanism for storing search artifacts. In the context of the ingest preview request 318, the dispatch directory stores effects. The repository 330 is hardware and/or software for storing search jobs 322 and the dispatch directory 324.

Figure 4:
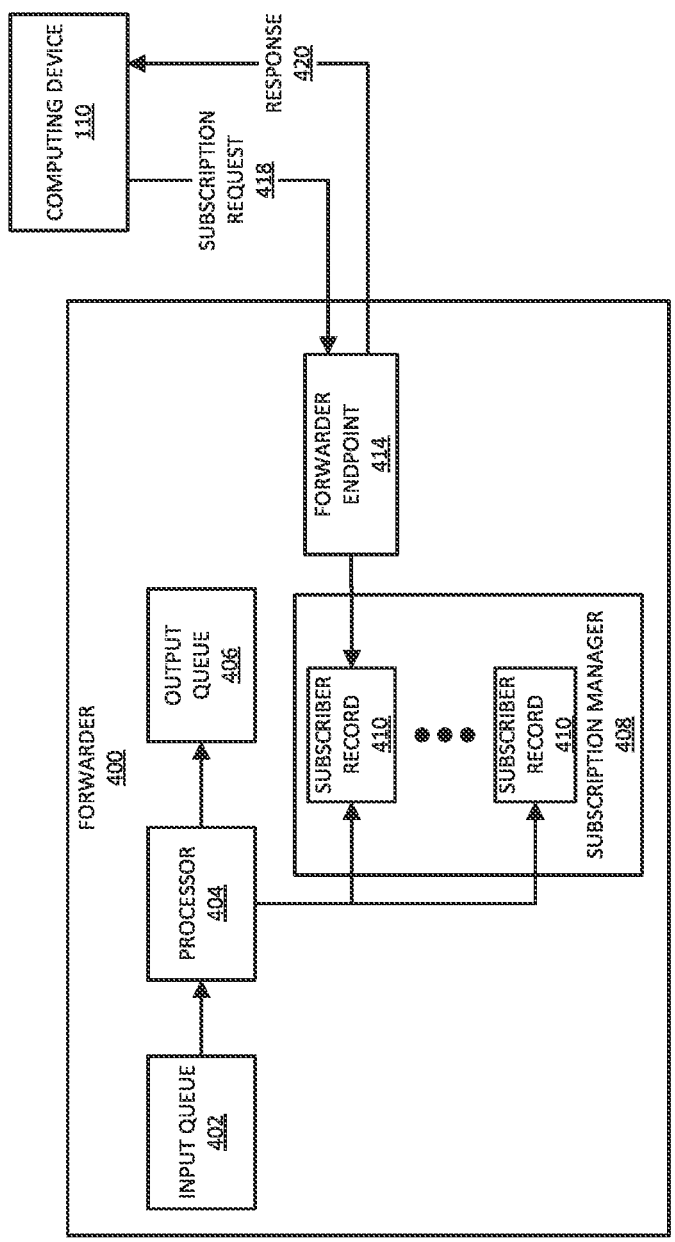
FIG. 4 illustrates an example diagram of a forwarder.

Turning to FIG. 4, the computing device 110 is configured to send a subscription request 418 to forwarders 400. FIG. 4 illustrates an example diagram of a forwarder 400. The forwarder 400 includes a forwarder endpoint 414 that is an endpoint of a connection. The forwarder endpoint 414 is configured to receive a subscription request 418 from the computing device 110 and transmit a response 420 to the computing device 110.

The subscription request is a request to subscribe to events that are processed by the particular forwarder. The subscription request may include subscription parameters. Similar to the ingest preview request, the subscription parameters may constrain the events and/or portions of the events that are returned in response to the subscription request. For example, the subscription request may include an expected output format, one or more event criteria, a number of events to be returned, and a timeout period. For example, the event criteria may be a source type specifying a type of data source or a type of component of the target system from which events are generated, field values of matching events, and other criteria of the matching events that should be returned. The subscription request may have different request parameters than the ingest preview request. For example, the subscription request may have fewer number of events to be returned because the subscription request is sent to multiple forwarders. By way of a more specific example, if the ingest preview request specifies 100 events, the subscription request sent to each of 4 forwarders may be 35 events. The 10 extra events per forwarder may be to allow some forwarders to not return a full set of events. The subscription request may include authentication parameters for authenticating the computing device to the forwarders and subscription parameters.

By way of an example, the subscription request may be a REST API call to the forwarder endpoint 414. The REST API call uses GET, PUT, POST, and DELETE to read, update, create, and delete data, respectively. In some implementations, the subscription request is a REST API call in a Hypertext Transport Protocol (HTTP) format.

For example, the REST API call for the subscription request may be of the following form:
POST/services/streams/streams/event-capture-local?output_mode=csv-d
"sourcetype=main&num_of_events=100&timeout sec=600"

In the above example, the REST API call is a POST request to create a new subscriber record on the forwarder 400. The REST API call includes request parameters requesting that the returned format of events is in comma separated value (CSV) format, the source type of matching data source is main, the maximum number of events to return is one hundred, and the subscription request timeouts at 600 seconds.

Responsive to the subscription request, the forwarder endpoint 414 provides the matching events. The matching events may be provided as an event stream. Namely, the matching events may be provided as streaming data transmitted from the forwarder 400 to the computing device 110. In such implementations, the forwarder 400 does not store the events prior to sending.

In other implementations in which the forwarder has such temporary storage, the request response may be the same or similar to the ingest preview request. For example, the subscription request may be a GET message with the subscription parameters, and the response may be a job identifier, by which the computing device may obtain matching events.

In either implementation of streaming or using temporary storage, the responsive set of events may follow the form:
<seq_num>, <time>, <index>, <host>, <source>, <sourcetype>, <linecount>, <raw>, <meta>

For example, the following are example events:
0,1643662752, internal,C02DW2Q2MD6M,/var/log/splunk/splunkd.log,splunkd,, Jan. 31, 2022 12:59:12.237-0800 INFO TailReader [2063083 tailreader0]-Batch input finished reading file='/spool/splunk/tracker.log', <meta>
1,1643662753, internal,C02DW2Q2MD6M,/var/log/splunk/metrics.log,splunkd,, "Jan. 31, 2022 12:59:13.638-0800 INFO Metrics-group=mpool, max_used_interval=100373, max_used=222590, avg_rsv=344, capacity=1073741824, used=284, rep_used-0", <meta>

Continuing with FIG. 4, multiple subscription requests 418 may be concurrently processed by the forwarder 400. Thus, the forwarder 400 includes a subscription manager 408 to track the subscriber record 410 for each subscription request. The subscriber record 410 includes an identifier of the subscription request and the matching parameters. Thus, the subscriber record 410 provides a streaming endpoint for the event stream. The subscription manager 408 is configured to create a new subscriber record 410 for a subscription request, register a new subscriber record with processor 404, and remove subscriber records when the stop condition in the subscription parameters occurs.

The forwarder 400 includes an input queue 402, processor 404, and output queue 406. The input queue 402 and output queue 406 are data structures, with optionally underlying storage, for temporarily storing events as the events are being processed by a next component of the forwarder. The input queue 402 temporarily stores events to be processed by processor 404. For example, the input queue 402 may include events directly or indirectly received from the data source that are not yet processed by the processor 404. The output queue 406 is a queue of events that are processed by the processor 404 and are ready for a subsequent processing by the forwarder 400 or to be transmitted to the next component (e.g., forwarder or indexer) of the network computer environment.

The combination of the input queue 402, processor 404, and output queue 406 intercepts events being processed by the forwarder 400 to respond to subscription requests. The processor 404 includes functionality to parse events in the input queue, compare the parsed events with the subscription parameters of each subscriber record, and clone events matching the subscription parameters. The event continues to the output queue 406 while the processor 404 sends the cloned event to the subscriber record 410 for responding to the computing device 110.

Figure 5:
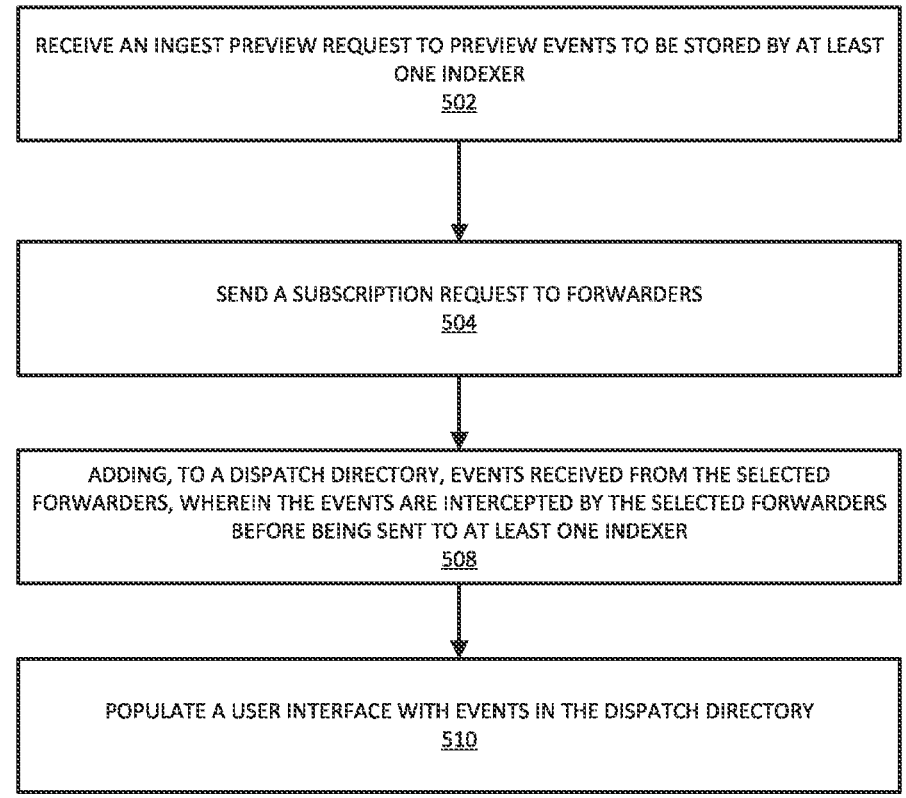
FIG. 5 illustrates an example process of the operations of the computing device.

FIG. 5 illustrates an example process 500 of the operations of the computing device to process an ingest preview request. The example process 500 can be implemented, for example, by a computing device that comprises a processor and a non-transitory computer-readable medium. The non-transitory computer readable medium can be storing instructions that, when executed by the processor, can cause the processor to perform the operations of the illustrated process 500. Alternatively, or additionally, the process 500 can be implemented using a non-transitory computer-readable medium storing instructions that, when executed by one or more processors, case the one or more processors to perform the operations of the process 500 of FIG. 5.

In Block 502, an ingest preview request is received to preview events to be stored by at least one indexer. The ingest preview request is to preview events that are being processed by one or more forwarders. The ingest preview request may be transmitted by the user interface system to the computing device. In the user interface, a user may request a sample set of events that are being indexed. When the user selects a sample widget in a user interface, the user interface system may generate the ingest preview request. The user interface system may use default parameters and the context of the user interface to define the request parameters. For example, if the user is working in a portion of the user interface for a particular data source type, then the user interface system includes a request parameter of the particular data source type. As another example, the user may want to preview events having certain fields; in such a scenario, the user may input into the user interface information about the matching fields. The user interface system may populate the ingest preview request with request parameters identifying the particular fields. Default parameters may exist for timeout and number of matching events. In some cases, the user may want an understanding of how certain filters adjust the set of events that are being index. In the example, the user interface system may send a request with the request parameters identifying the filters or may apply the filters on the events received.

In the computing device, the ingest preview request is received. If the user interface system is a different system than the computing device, then authentication may be performed. For example, authentication tokens or security keys may be checked to confirm that the user interface system is authenticated.

When the ingest preview request is received, the network access application extracts request parameters from the ingest preview request and creates a job with the parameters. The network access application may also create a dispatch directory for the events for the ingest preview request. Creating the job schedules the job and generates a job identifier. The job identifier may be sent as a response to the user interface system. In at least some implementations, the job is scheduled for immediate execution.

In some implementations, responsive to the ingest preview request, the computing device creates a search job. By creating a search job, the native search job functionality of the computing device may be used. For example, the search job manager may handle the creation of the job, dispatch directory, scheduling, and removing the dispatch directory. The search job manager may also check who can view received events stored in a dispatch directory.

In Block 504, the subscription request is sent to the forwarders. From the ingest preview request, a subscription request is generated as part of performing the job. To generate the subscription request, the subscription parameters are populated in the subscription request using the request parameters. Some of the subscription parameters may be direct copies of the request parameters, some of the subscription parameters may be default parameters, and some of the subscription parameters may be defined as a function of the request parameters. For example, the field values of matching events may be directly copied from the request parameters may be copied into the subscription parameters. As another example, timeout periods may be set as a default parameter while the number of events in the subscription parameters may be set as a default or as a function of the number of events in the request parameters.

Prior to sending the subscription request, the computing device may select a subset of the forwarders to obtain the selected forwarders. In a system having hundreds or even hundreds of thousands of forwarders, a sample may be generated as a request from a few of the forwarders. The subset may have multiple forwarders and much less than the total number of forwarders of the network computing environment. For example, when hundreds of forwarders exist, the subset may be as few as ten forwarders. Each forwarder may be considered equal in terms of providing the sample. Namely, from the computing device perspective, it may not matter which subset of forwarders is selected. In some implementations, the subset of forwarders is randomly selected such that each forwarder has an equal probability of selection. In other example implementations, the round robin may be used for the selection.

The subscription request is sent via the API call to the forwarder endpoints of the forwarders. If only a subset of forwarders is used, then the subscription request is sent to only the subset of forwarders. Connection parameters for connecting with the forwarders may be predefined in the computing device. For example, if the computing device is a deployment server, then the computing device has the connection parameters because the computing device manages the forwarders. If the computing device is a separate computing device, the forwarders may be registered with the computing device, and thereby have the connection parameters.

When the subscription request is sent, authentication may occur between the computing device and the forwarders in order to authenticate the computing device. The authentication may be performed, for example, as follows. When the subscription request is sent, the subscription request may be signed by a key. The forwarder may confirm that the key is correct using a key repository. The forwarder may generate the signature using its own shared secret key in its key repository. If the signature matches the one sent from the request, then the subscription request is validated.

In Block 508, events received from the selected forwarders are added to the dispatch directory, wherein the events are intercepted by the selected forwarders before the events are sent to at least one of the indexers. The sending of the subscription request triggers the forwarders to intercept events matching the subscription request and output the events. The events are outputted according to the subscription parameters. For example, the events may be outputted and correspondingly received in a comma separated value (CSV) format or other output format as specified by the subscription request.

When the events are received on the computing device, the events are written to a dispatch directory. When writing the events, the events may be transformed to a different format then the format that the events were received. For example, the events may be transformed from a CSV format to a JSON format. Other transformations may be performed, such as filtering portions of the events.

In at least some implementations, the events are written in the order in which the events are received regardless of which forwarder sent the events. For example, multiple event streams may be received from the multiple forwarders, such that each forwarder sends at most one event stream for a particular subscription request. The events are appended to the dispatch directory in the order in which the events are received regardless of which event stream. By way of an example, if two forwarders are both sending events in an event stream concurrently, then the events sent by the two forwarders are intermixed in the dispatch directory. Thus, the resulting ingest preview is a composite of events from the multiple forwarders.

While writing the events, monitoring is performed to determine whether a stop condition occurs. For example, the monitoring may be to maintain an event count and determine whether the event count satisfies a threshold maximum number of events. The monitoring may include determining whether a timeout occurs based on comparing a lapse time from sending the subscription request to the current time. If the lapse time is longer than the timeout, then the stop condition has occurred. When the stop condition occurs, the connection with the forwarders is stopped. Further, the job generated by the ingest preview request may be marked as completed.

Figure 7:
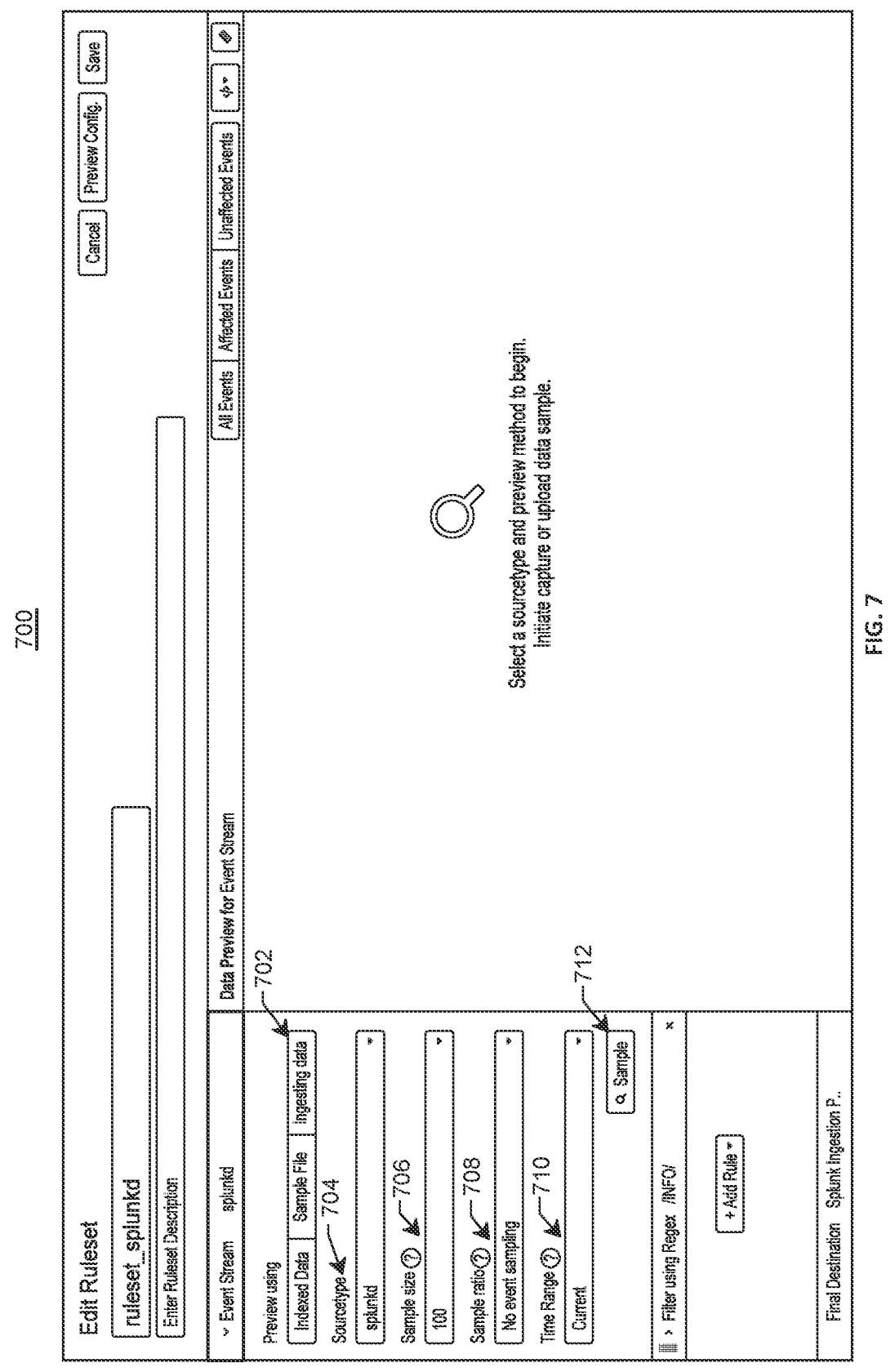
Figure 8:
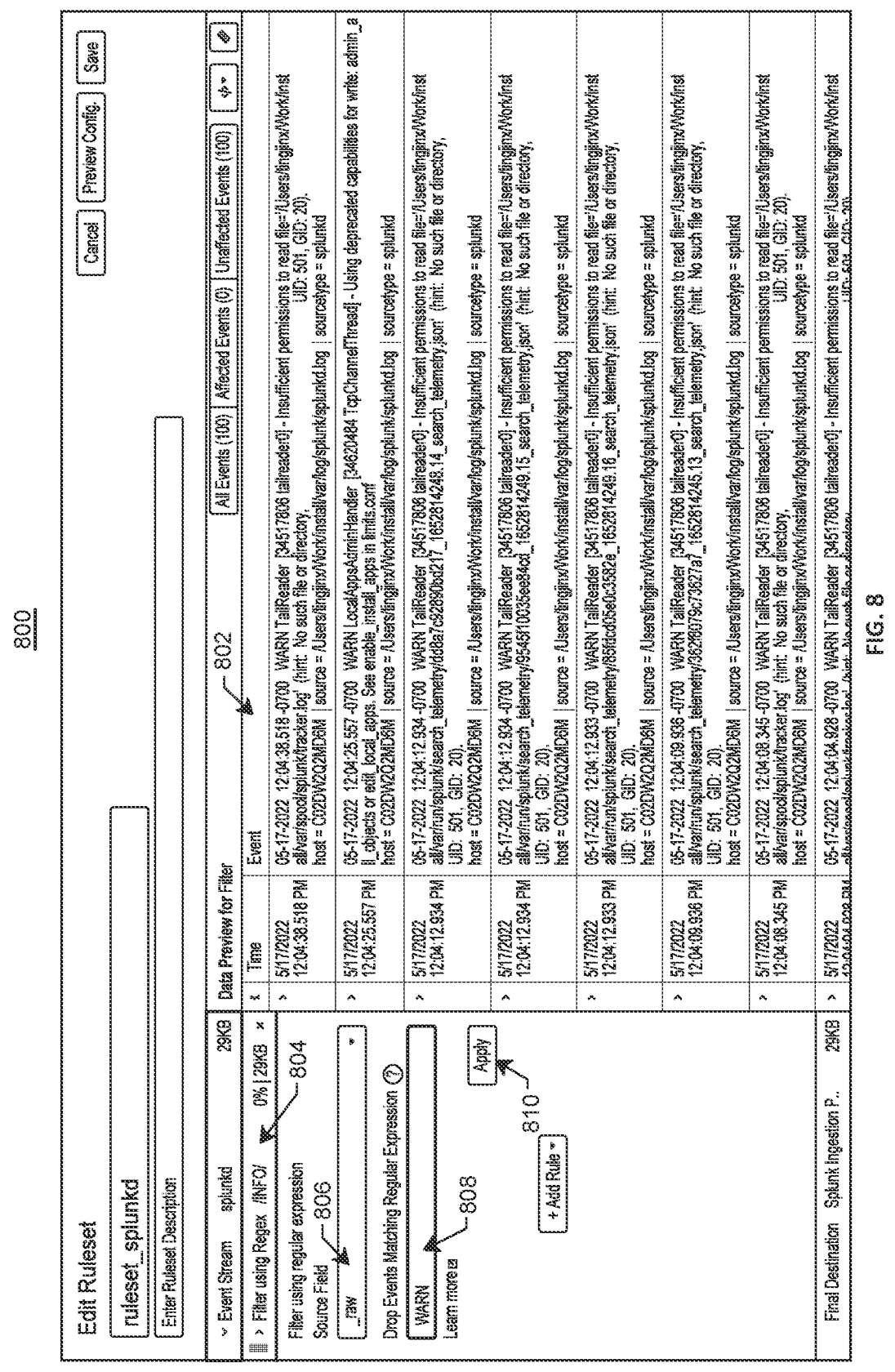
Figure 9:
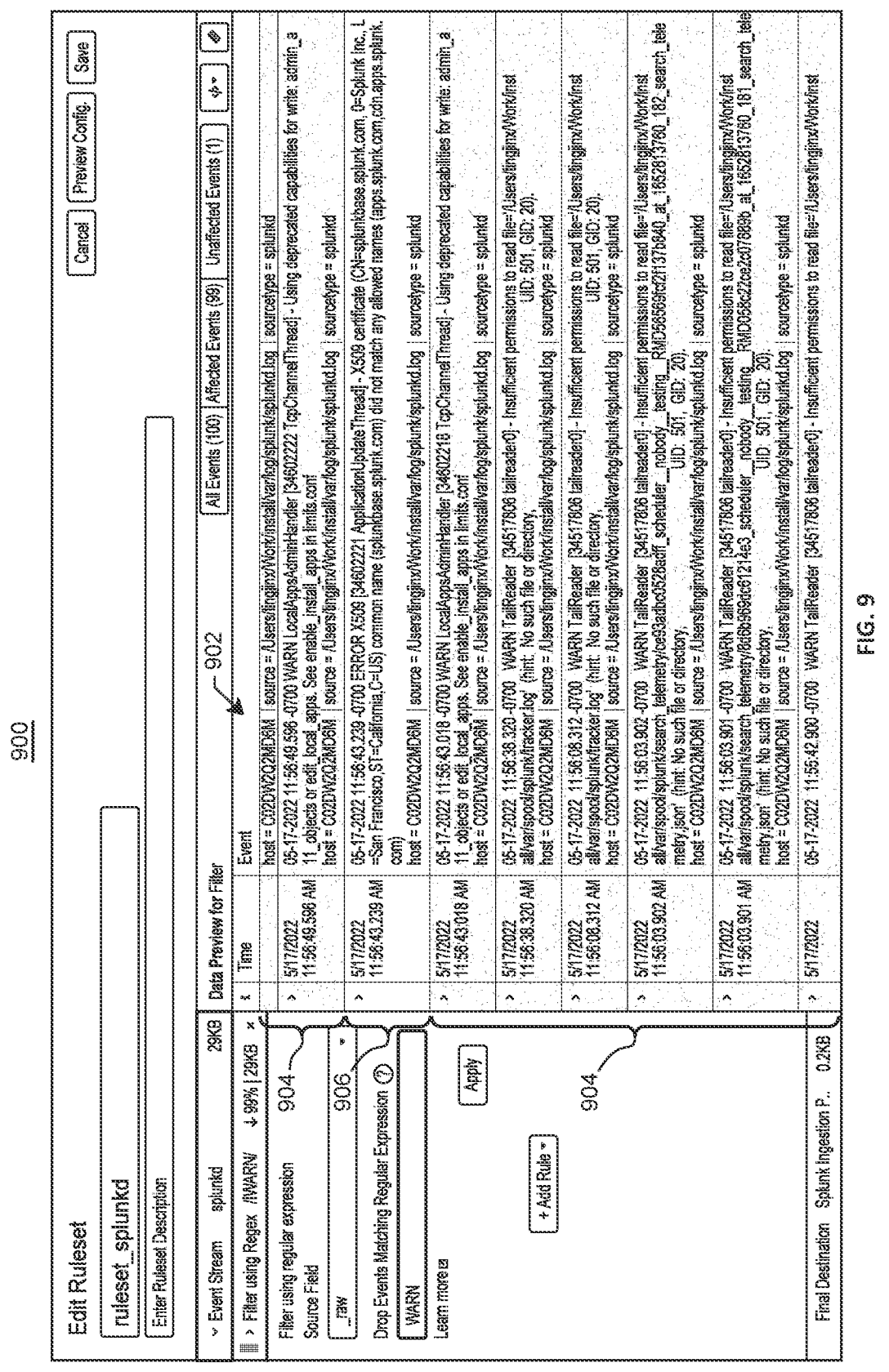

In Block 510, a user interface is populated with the events in the dispatch directory. When the computing system marks the job as complete, the computing system may send the events to the user interface system. The user interface system may subsequently access the dispatch queue to retrieve the events. As another example, the computing system may send the events to the user interface system when the job is complete. The user interface system may add the listing of events to the user interface. An example user interface is shown in FIGS. 7, 8, and 9. Events may be classified based on the category of the events. For example, consider the scenario in which a user wants to know which events will be affected by a filter. The classification is a binary classification identifying, for each event, whether the event is affected by the filter as a first category or whether the event is not affected by the filter as a second category. The event is then marked in the user interface with a marking indicating that the event is in the first category or the second category. An example marking may be a flag, highlighting, or other marking.

From the user interface, a user may determine that configuration changes should be made to the forwarders. For example, the user may decide to add, remove, or modify a filter, or add or remove forwarders. If the computing system is a deployment server, the configuration changes may be sent to the deployment server, which implements the changes.

The operations of FIG. 5 may be performed concurrently for each of multiple ingest preview requests. Thus, the computing device maintains separate jobs and dispatch directories and event streams for the multiple ingest preview requests.

Figure 6:
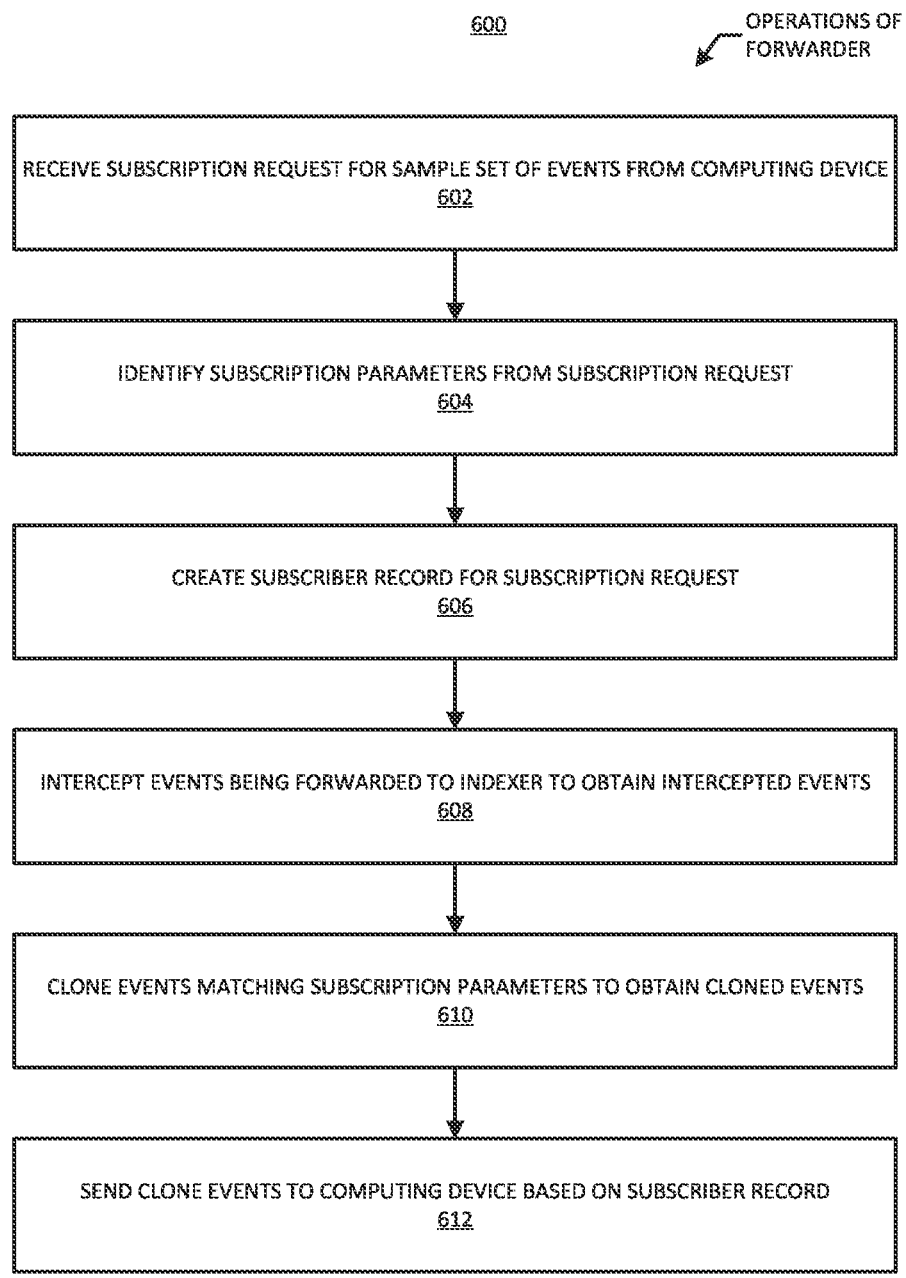
FIG. 6 illustrates an example process of the operations of the forwarder.

FIG. 6 illustrates an example process 600 of the operations of the forwarder. The operations of FIG. 6 may be performed on each forwarder to which the subscription request is sent. The example process 600 can be implemented, for example, by a computing device that comprises a processor and a non-transitory computer-readable medium. The non-transitory computer readable medium can be storing instructions that, when executed by the processor, can cause the processor to perform the operations of the illustrated process 600. Alternatively, or additionally, the process 600 can be implemented using a non-transitory computer-readable medium storing instructions that, when executed by one or more processors, cause the one or more processors to perform the operations of the process 600 of FIG. 6.

In Block 602, from the computing device, the subscription request is received for a sample set of events. For example, the subscription request may be received as the REST API call via the forwarder endpoint.

In Block 604, subscription parameters are received from the subscription request. The request is identified as a subscription request and transmitted to the subscription manager. The subscription manager parses the subscription request to identify the subscription parameters.

In Block 606, a subscriber record is created for the subscription request. The subscription manager identifies the event criteria from the subscription parameters and adds the event criteria to the subscriber record. The subscription manager may further configure the subscriber record with the stop condition in the subscriber parameters. Further, the subscription manager may register the subscriber record with the processor.

In Block 608, events being forwarded to the indexer are intercepted to obtain intercepted events. The events are intercepted and added to the input queue. The processor on the forwarder parses the intercepted events and compares the events with the subscriber records. In Block 610, the intercepted events which match the subscription parameters are cloned to obtain cloned events. For each subscriber record, the processor determines whether the intercepted event being processed has the event criteria specified in the subscriber record. If the intercepted event matches the subscriber record, then the intercepted event is cloned and sent to the subscriber record as a cloned event. Thus, for example, if a first subscription request includes a subscription parameter specifying source type 1 and a second subscription request includes a subscription parameter specifying source type 2, then the processor determines whether the intercepted events include a source type field value of 1, a source type field value of 2, or another source type field value. The processor clones the intercepted events having source type field value of 1 and sends the cloned events having source type field value of 1 to the subscriber record corresponding to the first subscription request. The processor clones the intercepted events having source type field value of 2 and sends the cloned events having source type field value of 2 to the subscriber record corresponding to the second subscription request. If there are no more subscriber records, then the remaining events that do not have a source type field value of 1 or 2 are ignored and the forwarding continues. Thus, the events are intercepted prior to being sent to the indexer.

In Block 612, the cloned events are sent to the computing device based on the subscriber record. The subscription manager adds the cloned event to the event stream corresponding to the subscription request of the subscriber record. The event stream is provided as a response (e.g., 420 of FIG. 4). The event stream is transmitted to the computing device. As another example, after a timeout period, the computing device may request the matching events.

As shown in FIGS. 1-6, the technology provides a real-time preview of events from multiple forwarders. The ingest preview request immediately triggers the subscription requests to the forwarders. The forwarders respond with an event stream of events that may then be used to populate the user interface. Thus, the user interface may show the data being ingested before or concurrently with sending the event stream.

FIGS. 7, 8, and 9 are example user interfaces in which one or more embodiments may be implemented. FIG. 7 illustrates an example user interface 700. The user may select to have an ingest preview request of ingesting data 702 or data being ingested. In the ingest preview request, the user may select the source type 704, the sample size 706 specifying the number of events in the sample, the sample ratio 708, and, optionally, a time range 710 which includes a current time interval. When the user selects the sample button 712, then the ingest preview request is generated. The ingest preview request specifies that the maximum number of events is 100. The user interface system that generated FIG. 7 sends the ingest preview request to the deployment server. The deployment server selects a subset of forwarders and sends the subscription request to the forwarders. Responsive to the subscription request, the forwarders generate a subscriber record and send streaming events to the deployment server. The user interface polls the deployment server until the job is complete (e.g., when 100 events are obtained or the timeout is reached in the example. The user interface system retrieves the events via the dispatch directory and displays the user interface 800 shown in FIG. 8.

FIG. 8 illustrates an example user interface 800 transitioned from FIG. 7. To the user, the operations of the user interface system, deployment server, and forwarders appear immediate. The system immediately responds with events 802. Events 802 are a set of events that are intercepted before the events are indexed and are obtained from multiple forwarders.

The user may want to see what happens if the user were to filter the events before the events were indexed. In such a scenario, the user may select to filter the events using the regex menu option 804. The user may then specify the source field in box 806 and the value of the source field in box 808 of the events to drop. When the user selects apply button 810, the same events as shown in box 802 may be filtered. Alternatively, when the apply button 810 is selected, a new ingest preview request may be generated that specifies to categorize newly received events from the forwarders using the regex. For example, the user interface system that generated FIG. 8 sends a new ingest preview request to the deployment server. The deployment server selects a new subset of forwarders and sends the subscription request to the forwarders. Responsive to the new subscription requests, the forwarders generate a subscriber record and send streaming events to the deployment server. The deployment server or the user interface system may categorize the events based on whether the events match the regex of having the raw field specify "WARN." The resulting events are shown in FIG. 9.

FIG. 9 illustrates an example user interface 900 transitioned from FIG. 8. In FIG. 9, box 902 show the events. Some events 904 are marked based on color coding to be dropped if the regex filter is applied and other events 906 are marked to not be dropped. Thus, the two categories in the example exist. By showing the number of events and the types of events that are marked, the user may see how adjusting the configuration of the forwarders may adjust the data being ingested.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 10:
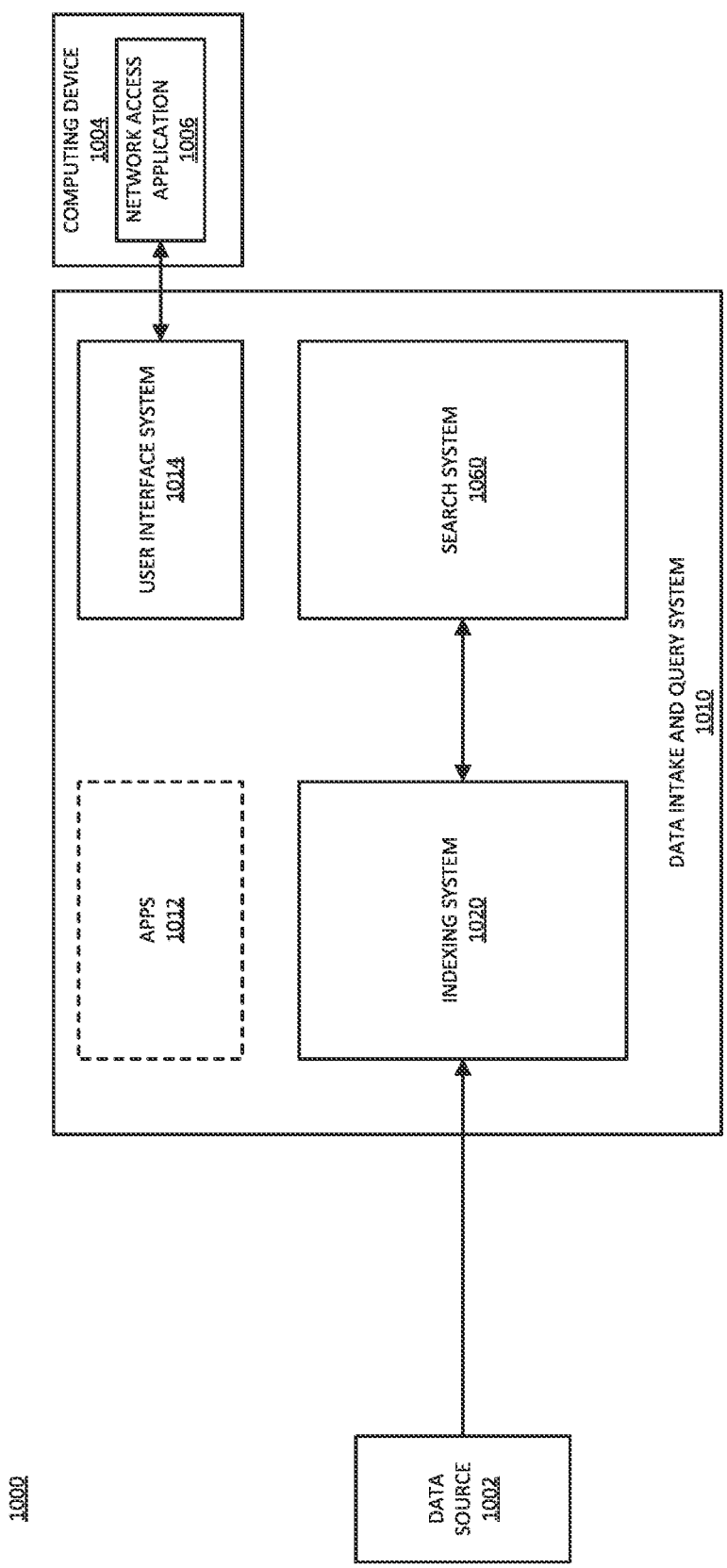
FIG. 10 illustrates an example data intake and query system in which FIG. 1 may be implemented.

FIG. 10 is a block diagram illustrating an example computing environment 1000 that includes a data intake and query system 1010. The data intake and query system 1010 obtains data from a data source 1002 in the computing environment 1000, and ingests the data using an indexing system 1020. A search system 1060 of the data intake and query system 1010 enables users to navigate the indexed data. Though drawn with separate boxes in FIG. 10, in some implementations the indexing system 1020 and the search system 1060 can have overlapping components. A computing device 1004, running a network access application 1006, can communicate with the data intake and query system 1010 through a user interface system 1014 of the data intake and query system 1010. Using the computing device 1004, a user can perform various operations with respect to the data intake and query system 1010, such as administration of the data intake and query system 1010, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1010 can further optionally include apps 1012 that extend the search, analytics, and/or visualization capabilities of the data intake and query system 1010.

The data intake and query system 1010 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1010 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1010 can be executed on a single computing device, or execution of the program code can be distributed over multiple computing devices. For example, the program code can include instructions for both indexing and search components (which may be part of the indexing system 1020 and/or the search system 1060, respectively), which can be executed on a computing device that also provides the data source 1002. As another example, the program code can be executed on one computing device, where execution of the program code provides both indexing and search components, while another copy of the program code executes on a second computing device that provides the data source 1002. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1002 of the computing environment 1000 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1002 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1020 obtains machine date from the data source 1002 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1020 does not require prior knowledge of the structure of incoming data (e.g., the indexing system 1020 does not need to be provided with a schema describing the data). Additionally, the indexing system 1020 retains a copy of the data as it was received by the indexing system 1020 such that the original data is always available for searching (e.g., no data is discarded, though, in some examples, the indexing system 1020 can be configured to do so).

The search system 1060 searches the data stored by the indexing 1020 system. As discussed in greater detail below, the search system 1060 enables users associated with the computing environment 1000 (and possibly also other users) to navigate the data, generate reports, and visualize search results in "dashboards" output using a graphical interface. Using the facilities of the search system 1060, users can obtain insights about the data, such as retrieving events from an index, calculating metrics, searching for specific conditions within a rolling time window, identifying patterns in the data, and predicting future trends, among other examples. To achieve greater efficiency, the search system 1060 can apply map-reduce methods to parallelize searching of large volumes of data. Additionally, because the original data is available, the search system 1060 can apply a schema to the data at search time. This allows different structures to be applied to the same data, or for the structure to be modified if or when the content of the data changes. Application of a schema at search time may be referred to herein as a late-binding schema technique.

The user interface system 1014 provides mechanisms through which users associated with the computing environment 1000 (and possibly others) can interact with the data intake and query system 1010. These interactions can include configuration, administration, and management of the indexing system 1020, initiation and/or scheduling of queries that are to be processed by the search system 1060, receipt or reporting of search results, and/or visualization of search results. The user interface system 1014 can include, for example, facilities to provide a command line interface or a web-based interface.

Users can access the user interface system 1014 using a computing device 1004 that communicates with data intake and query system 1010, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1000. For example, a person can log in as a particular user and, using the user's digital information, can access the data intake and query system 1010. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1004 can provide a human-machine interface through which a person can have a digital presence in the computing environment 1000 in the form of a user. The computing device 1004 is an electronic device having one or more processors and a memory capable of storing instructions for execution by the one or more processors. The computing device 1004 can further include input/output (I/O) hardware and a network interface. Applications executed by the computing device 1004 can include a network access application 1006, such as a web browser, which can use a network interface of the client computing device 1004 to communicate, over a network, with the user interface system 1014 of the data intake and query system 1010. The user interface system 1014 can use the network access application 1006 to generate user interfaces that enable a user to interact with the data intake and query system 1010. A web browser is one example of a network access application. A shell tool can also be used as a network access application. In some examples, the data intake and query system 1010 is an application executing on the computing device 1004. In such examples, the network access application 1006 can access the user interface system 1014 without going over a network.

The data intake and query system 1010 can optionally include apps 1012. An app of the data intake and query system 1010 is a collection of configurations, knowledge objects (a user-defined entity that enriches the data in the data intake and query system 1010), views, and dashboards that may provide additional functionality, different techniques for searching the data, and/or additional insights into the data. The data intake and query system 1010 can execute multiple applications simultaneously. Example applications include an information technology service intelligence application, which can monitor and analyze the performance and behavior of the computing environment 1000, and an enterprise security application, which can include content and searches to assist security analysts in diagnosing and acting on anomalous or malicious behavior in the computing environment 1000.

Though FIG. 10 illustrates only one data source, in practical implementations, the computing environment 1000 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1000, the data intake and query system 1010 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1000 can include on-prem and cloud-based computing resources, or only cloud-based resources. For example, an entity may have on-prem computing devices and a private cloud. In this example, the entity operates the data intake and query system 1010 and can choose to execute the data intake and query system 1010 on an on-prem computing device or in the cloud. In another example, a provider entity operates the data intake and query system 1010 in a public cloud and provides the functionality of the data intake and query system 1010 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1010. In some implementations, the entity providing the data intake and query system 1010 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1010, and a third entity can subscribe to the services of the second provider entity in order to use the functionality of the data intake and query system 1010. In this example, the data sources are associated with the third entity, users accessing the data intake and query system 1010 are associated with the third entity, and the analytics and insights provided by the data intake and query system 1010 are for purposes of the third entity's operations.

Figure 11:
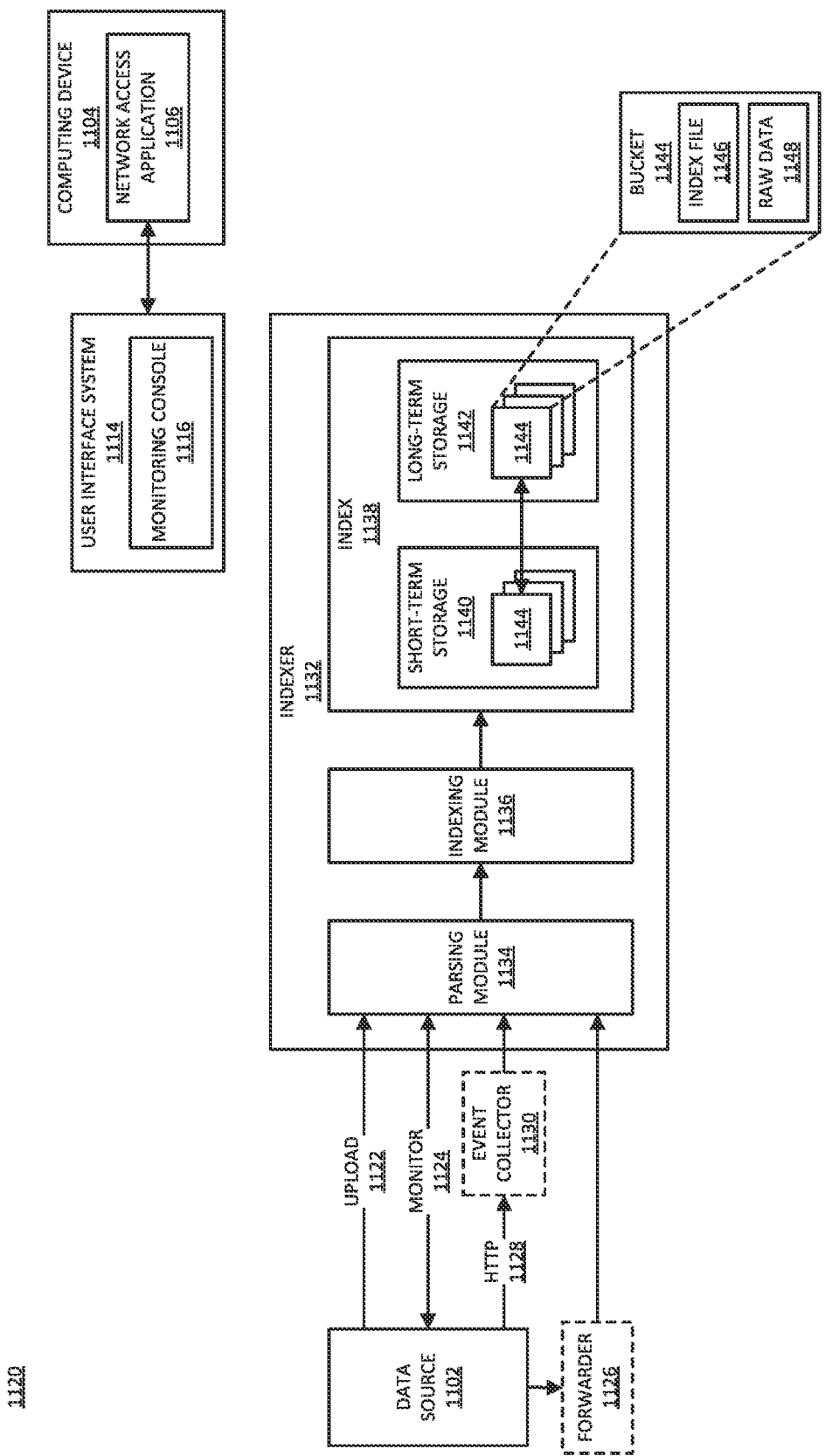
FIG. 11 illustrates an example schematic diagram of data ingest in the data intake and query system in which FIG. 1 may be implemented.

FIG. 11 is a block diagram illustrating in greater detail an example of an indexing system 1120 of a data intake and query system, such as the data intake and query system 1010 of FIG. 10. The indexing system 1120 of FIG. 11 uses various methods to obtain machine data from a data source 1102 and stores the data in an index 1138 of an indexer 1132. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1120 enables the data intake and query system to obtain the machine data produced by the data source 1102 and to store the data for searching and retrieval.

Users can administer the operations of the indexing system 1120 using a computing device 1104 that can access the indexing system 1120 through a user interface system 1114 of the data intake and query system. For example, the computing device 1104 can be executing a network access application 1106, such as a web browser or a terminal, through which a user can access a monitoring console 1116 provided by the user interface system 1114. The monitoring console 1116 can enable operations such as: identifying the data source 1102 for data ingestion; configuring the indexer 1132 to index the data from the data source 1102; configuring a data ingestion method; configuring, deploying, and managing clusters of indexers; and viewing the topology and performance of a deployment of the data intake and query system, among other operations. The operations performed by the indexing system 1120 may be referred to as "index time" operations, which are distinct from "search time" operations that are discussed further below.

The indexer 1132, which may be referred to herein as a data indexing component, coordinates and performs most of the index time operations. The indexer 1132 can be implemented using program code that can be executed on a computing device. The program code for the indexer 1132 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1132. In some implementations, the indexer 1132 executes on the computing device 1104 through which a user can access the indexing system 1120. In some implementations, the indexer 1132 executes on a different computing device than the illustrated computing device 1104.

The indexer 1132 may be executing on the computing device that also provides the data source 1102 or may be executing on a different computing device. In implementations wherein the indexer 1132 is on the same computing device as the data source 1102, the data produced by the data source 1102 may be referred to as "local data." In other implementations the data source 1102 is a component of a first computing device and the indexer 1132 executes on a second computing device that is different from the first computing device. In these implementations, the data produced by the data source 1102 may be referred to as "remote data." In some implementations, the first computing device is "on-prem" and in some implementations the first computing device is "in the cloud." In some implementations, the indexer 1132 executes on a computing device in the cloud and the operations of the indexer 1132 are provided as a service to entities that subscribe to the services provided by the data intake and query system.

For a given data produced by the data source 1102, the indexing system 1120 can be configured to use one of several methods to ingest the data into the indexer 1132. These methods include upload 1122, monitor 1124, using a forwarder 1126, or using HyperText Transfer Protocol (HTTP 1128) and an event collector 1130. These and other methods for data ingestion may be referred to as "getting data in" (GDI) methods.

Using the upload 1122 method, a user can specify a file for uploading into the indexer 1132. For example, the monitoring console 1116 can include commands or an interface through which the user can specify where the file is located (e.g., on which computing device and/or in which directory of a file system) and the name of the file. The file may be located at the data source 1102 or maybe on the computing device where the indexer 1132 is executing. Once uploading is initiated, the indexer 1132 processes the file, as discussed further below. Uploading is a manual process and occurs when instigated by a user. For automated data ingestion, the other ingestion methods are used.

The monitor 1124 method enables the indexing system 1102 to monitor the data source 1102 and continuously or periodically obtain data produced by the data source 1102 for ingestion by the indexer 1132. For example, using the monitoring console 1116, a user can specify a file or directory for monitoring. In this example, the indexing system 1102 can execute a monitoring process that detects whenever the file or directory is modified and causes the file or directory contents to be sent to the indexer 1132. As another example, a user can specify a network port for monitoring. In this example, a monitoring process can capture data received at or transmitting from the network port and cause the data to be sent to the indexer 1132. In various examples, monitoring can also be configured for data sources such as operating system event logs, performance data generated by an operating system, operating system registries, operating system directory services, and other data sources.

Monitoring is available when the data source 1102 is local to the indexer 1132 (e.g., the data source 1102 is on the computing device where the indexer 1132 is executing). Other data ingestion methods, including forwarding and the event collector 1130, can be used for either local or remote data sources.

A forwarder 1126, which may be referred to herein as a data forwarding component, is a software process that sends data from the data source 1102 to the indexer 1132. The forwarder 1126 can be implemented using program code that can be executed on the computer device that provides the data source 1102. A user launches the program code for the forwarder 1126 on the computing device that provides the data source 1102. The user can further configure the forwarder 1126, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1126 can provide various capabilities. For example, the forwarder 1126 can send the data unprocessed or can perform minimal processing on the data before sending the data to the indexer 1132. Minimal processing can include, for example, adding metadata tags to the data to identify a source, source type, and/or host, among other information, dividing the data into blocks, and/or applying a timestamp to the data. In some implementations, the forwarder 1126 can break the data into individual events (event generation is discussed further below) and send the events to a receiver. Other operations that the forwarder 1126 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1130 provides an alternate method for obtaining data from the data source 1102. The event collector 1130 enables data and application events to be sent to the indexer 1132 using HTTP 1128. The event collector 1130 can be implemented using program code that can be executing on a computing device. The program code may be a component of the data intake and query system or can be a standalone component that can be executed independently of the data intake and query system and operates in cooperation with the data intake and query system.

To use the event collector 1130, a user can, for example using the monitoring console 1116 or a similar interface provided by the user interface system 1114, enable the event collector 1130 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1102 as an alternative method to using a username and password for authentication.

To send data to the event collector 1130, the data source 1102 is supplied with a token and can then send HTTP 1128 requests to the event collector 1130. To send HTTP 1128 requests, the data source 1102 can be configured to use an HTTP client and/or to use logging libraries such as those supplied by Java, JavaScript, and .NET libraries. An HTTP client enables the data source 1102 to send data to the event collector 1130 by supplying the data, and a Uniform Resource Identifier (URI) for the event collector 1130 to the HTTP client. The HTTP client then handles establishing a connection with the event collector 1130, transmitting a request containing the data, closing the connection, and receiving an acknowledgment if the event collector 1130 sends one. Logging libraries enable HTTP 1128 requests to the event collector 1130 to be generated directly by the data source. For example, an application can include or link a logging library, and through functionality provided by the logging library manage establishing a connection with the event collector 1130, transmitting a request, and receiving an acknowledgement.

An HTTP 1128 request to the event collector 1130 can contain a token, a channel identifier, event metadata, and/or event data. The token authenticates the request with the event collector 1130. The channel identifier, if available in the indexing system 1120, enables the event collector 1130 to segregate and keep separate data from different data sources. The event metadata can include one or more key-value pairs that describe the data source 1102 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1130 extracts events from HTTP 1128 requests and sends the events to the indexer 1132. The event collector 1130 can further be configured to send events to one or more indexers. Extracting the events can include associating any metadata in a request with the event or events included in the request. In these implementations, event generation by the indexer 1132 (discussed further below) is bypassed, and the indexer 1132 moves the events directly to indexing. In some implementations, the event collector 1130 extracts event data from a request and outputs the event data to the indexer 1132, and the indexer generates events from the event data. In some implementations, the event collector 1130 sends an acknowledgement message to the data source 1102 to indicate that the event collector 1130 has received a particular request form the data source 1102, and/or to indicate to the data source 1102 that events in the request have been added to an index.

The indexer 1132 ingests incoming data and transforms the data into searchable knowledge in the form of events. In the data intake and query system, an event is a single piece of data that represents activity of the component represented in FIG. 11 by the data source 1102. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1132 can include a parsing module 1134 and an indexing module 1136 for generating and storing the events. The parsing module 1134 and indexing module 1136 can be modular and pipelined, such that one component can be operating on a first set of data while the second component is simultaneously operating on a second sent of data. Additionally, the indexer 1132 may at any time have multiple instances of the parsing module 1134 and indexing module 1136, with each set of instances configured to simultaneously operate on data from the same data source or from different data sources. The parsing module 1134 and indexing module 1136 are illustrated in FIG. 11 to facilitate discussion, with the understanding that implementations with other components are possible to achieve the same functionality.

The parsing module 1134 determines information about incoming event data, where the information can be used to identify events within the event data. For example, the parsing module 1134 can associate a source type with the event data. A source type identifies the data source 1102 and describes a possible data structure of event data produced by the data source 1102. For example, the source type can indicate which fields to expect in events generated at the data source 1102 and the keys for the values in the fields, and possibly other information such as sizes of fields, an order of the fields, a field separator, and so on. The source type of the data source 1102 can be specified when the data source 1102 is configured as a source of event data. Alternatively, the parsing module 1134 can determine the source type from the event data, for example from an event field in the event data or using machine learning techniques applied to the event data.

Other information that the parsing module 1134 can determine includes timestamps. In some cases, an event includes a timestamp as a field, and the timestamp indicates a point in time when the action represented by the event occurred or was recorded by the data source 1102 as event data. In these cases, the parsing module 1134 may be able to determine from the source type associated with the event data that the timestamps can be extracted from the events themselves. In some cases, an event does not include a timestamp and the parsing module 1134 determines a timestamp for the event, for example from a name associated with the event data from the data source 1102 (e.g., a file name when the event data is in the form of a file) or a time associated with the event data (e.g., a file modification time). As another example, when the parsing module 1134 is not able to determine a timestamp from the event data, the parsing module 1134 may use the time at which it is indexing the event data. As another example, the parsing module 1134 can use a user-configured rule to determine the timestamps to associate with events.

The parsing module 1134 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1134 may be able to determine event boundaries from the source type associated with the event data, for example from a data structure indicated by the source type. In some implementations, a user can configure rules the parsing module 1134 can use to identify event boundaries.

The parsing module 1134 can further extract data from events and possibly also perform transformations on the events. For example, the parsing module 1134 can exteract a set of fields (key-value pairs) for each event, such as a host or hostname, source or source name, and/or source type. The parsing module 1134 may extract certain fields by default or based on a user configuration. Alternatively or additionally, the parsing module 1134 may add fields to events, such as a source type or a user-configured field. As another example of a transformation, the parsing module 1134 can anonymize fields in events to mask sensitive information, such as social security numbers or account numbers. Anonymizing fields can include changing or replacing values of specific fields. The parsing component 1134 can further perform user-configured transformations.

The parsing module 1134 outputs the results of processing incoming event data to the indexing module 1136, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1132 can be configured to identify searchable segments that are parts of fields, searchable segments that are entire fields, or both. The parsing module 1134 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1146, to find event data that matches a search query. In some implementations, segmentation can alternatively be performed by the forwarder 1126. Segmentation can also be disabled, in which case the indexer 1132 will not build a lexicon for the event data. When segmentation is disabled, the search system searches the event data directly.

Building index data structures generates the index 1138. The index 1138 is a storage data structure on a storage device (e.g., a disk drive or other physical device for storing digital data). The storage device may be a component of the computing device on which the indexer 1132 is operating (referred to herein as local storage) or may be a component of a different computing device (referred to herein as remote storage) that the indexer 1138 has access to over a network. The indexer 1132 can manage more than one index and can manage indexes of different types. For example, the indexer 1132 can manage event indexes, which impose minimal structure on stored data and can accommodate any type of data. As another example, the indexer 1132 can manage metrics indexes, which use a highly structured format to handle the higher volume and lower latency demands associated with metrics data.

The indexing module 1136 organizes files in the index 1138 in directories referred to as buckets. The files in a bucket 1144 can include raw data files, index files, and possibly also other metadata files. As used herein, "raw data" means data as when the data was produced by the data source 1102, without alteration to the format or content. As noted previously, the parsing component 1134 may add fields to event data and/or perform transformations on fields in the event data. Event data that has been altered in this way is referred to herein as enriched data. A raw data file 1148 can include enriched data, in addition to or instead of raw data. The raw data file 1148 may be compressed to reduce disk usage. An index file 1146, which may also be referred to herein as a "time-series index" or tsidx file, contains metadata that the indexer 1132 can use to search a corresponding raw data file 1148. As noted above, the metadata in the index file 1146 includes a lexicon of the event data, which associates each unique keyword in the event data with a reference to the location of event data within the raw data file 1148. The keyword data in the index file 1146 may also be referred to as an inverted index. In various implementations, the data intake and query system can use index files for other purposes, such as to store data summarizations that can be used to accelerate searches.

A bucket 1144 includes event data for a particular range of time. The indexing module 1136 arranges buckets in the index 1138 according to the age of the buckets, such that buckets for more recent ranges of time are stored in short-term storage 1140 and buckets for less recent ranges of time are stored in long-term storage 1142. Short-term storage 1140 may be faster to access while long-term storage 1142 may be slower to access. Buckets may be moves from short-term storage 1140 to long-term storage 1142 according to a configurable data retention policy, which can indicate at what point in time a bucket is old enough to be moved.

A bucket's location in short-term storage 1140 or long-term storage 1142 can also be indicated by the bucket's status. As an example, a bucket's status can be "hot," "warm," "cold," "frozen," or "thawed." In this example, hot bucket is one to which the indexer 1132 is writing data and the bucket becomes a warm bucket when the index 1132 stops writing data to it. In this example, both hot and warm buckets reside in short-term storage 1140. Continuing this example, when a warm bucket is moved to long-term storage 1142, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1120 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each bucket must exist within the cluster), and indexers to which buckets are copied may be selected to optimize distribution of data across the cluster.

A user can view the performance of the indexing system 1120 through the monitoring console 1116 provided by the user interface system 1114. Using the monitoring console 1116, the user can configure and monitor an index cluster, and see information such as disk usage by an index, volume usage by an indexer, index and volume size over time, data age, statistics for bucket types, and bucket settings, among other information.

Figure 12:
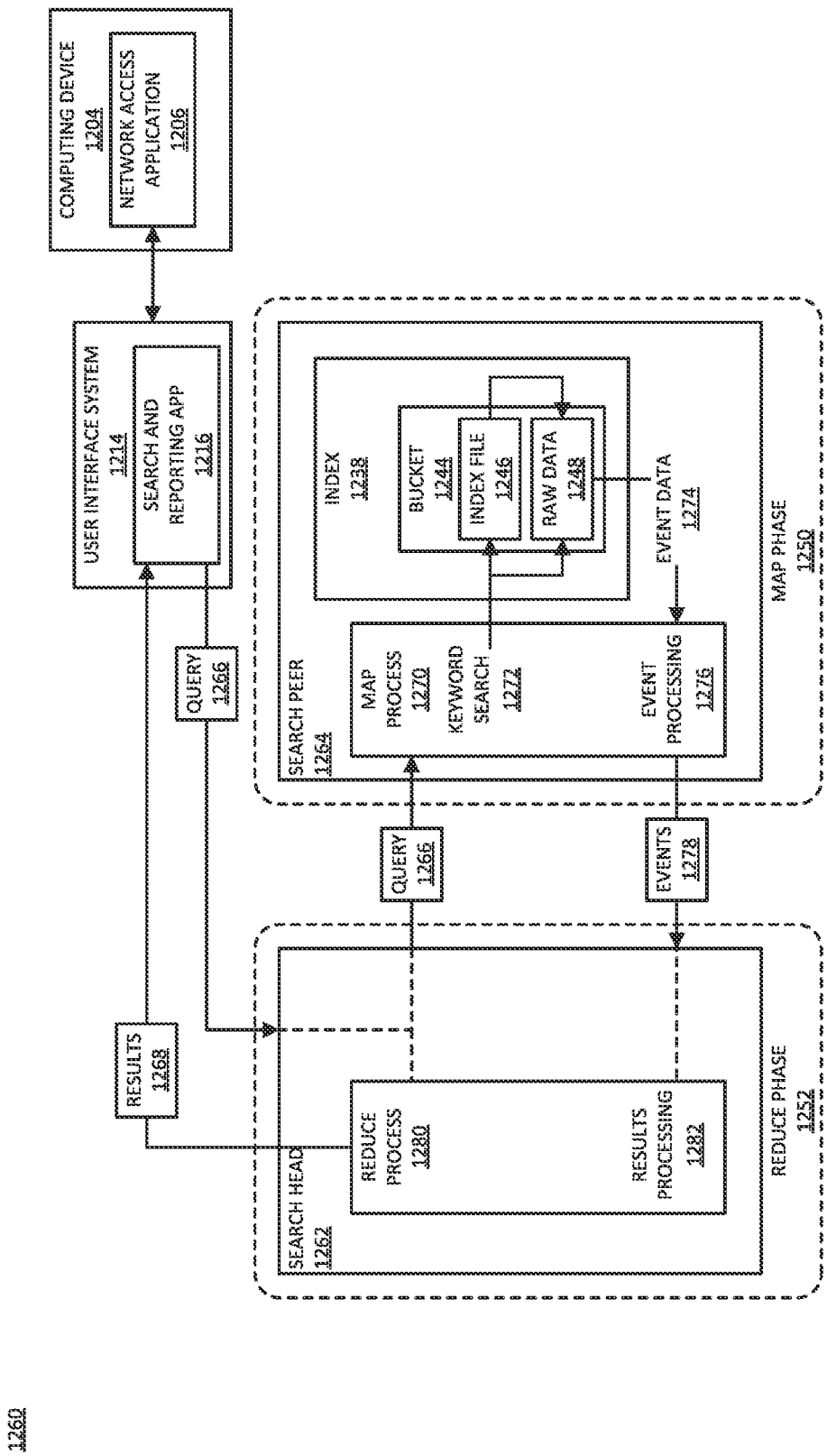
FIG. 12 illustrates an example schematic diagram of search in the data intake and query system in which FIG. 1 may be implemented.

FIG. 12 is a block diagram illustrating in greater detail an example of the search system 1260 of a data intake and query system, such as the data intake and query system 1010 of FIG. 10. The search system 1260 of FIG. 12 issues a query 1266 to a search head 1262, which sends the query 1266 to a search peer 1264. Using a map process 1270, the search peer 1264 searches the appropriate index 1238 for events identified by the query 1266 and sends events 1278 so identified back to the search head 1262. Using a reduce process 1282, the search head 1262 processes the events 1278 and produces results 1268 to respond to the query 1266. The results 1268 can provide useful insights about the data stored in the index 1238. These insights can aid in the administration of information technology systems, in security analysis of information technology systems, and/or in analysis of the development environment provided by information technology systems.

The query 1266 that initiates a search is produced by a search and reporting app 1216 that is available through the user interface system 1214 of the data intake and query system. Using a network access application 1206 executing on a computing device 1204, a user can input the query 1266 into a search field provided by the search and reporting app 1216. Alternatively or additionally, the search and reporting app 1216 can include pre-configured queries or stored queries that can be activated by the user. In some cases, the search and reporting app 1216 initiates the query 1266 when the user enters the query 1266. In these cases, the query 1266 maybe referred to as an "ad-hoc" query. In some cases, the search and reporting app 1216 initiates the query 1266 based on a schedule. For example, the search and reporting app 1216 can be configured to execute the query 1266 once per hour, once per day, at a specific time, on a specific date, or at some other time that can be specified by a date, time, and/or frequency. These types of queries maybe referred to as scheduled queries.

The query 1266 is specified using a search processing language. The search processing language includes commands or search terms that the search peer 1264 will use to identify events to return in the search results 1268. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1266 to include sequential commands, where a subsequent command may operate on the results of a prior command. As an example, sequential commands may be separated in the query 1266 by a vertical line ("|" or "pipe") symbol.

In addition to one or more search commands, the query 1266 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1266 occurs in two broad phases: a map phase 1250 and a reduce phase 1252. The map phase 1250 takes place across one or more search peers. In the map phase 1250, the search peers locate event data that matches the search terms in the search query 1266 and sorts the event data into field-value pairs. When the map phase 1250 is complete, the search peers send events that they have found to one or more search heads for the reduce phase 1252. During the reduce phase 1252, the search heads process the events through commands in the search query 1266 and aggregate the events to produce the final search results 1268.

A search head, such as the search head 1262 illustrated in FIG. 12, is a component of the search system 1260 that manages searches. The search head 1262, which may also be referred to herein as a search management component, can be implemented using program code that can be executed on a computing device. The program code for the search head 1262 can be stored on a non-transitory computer-readable medium and from this medium can be loaded or copied to the memory of a computing device. One or more hardware processors of the computing device can read the program code from the memory and execute the program code in order to implement the operations of the search head 1262.

Upon receiving the search query 1266, the search head 1262 directs the query 1266 to one or more search peers, such as the search peer 1264 illustrated in FIG. 12. "Search peer" is an alternate name for "indexer" and a search peer may be largely similar to the indexer described previously. The search peer 1264 may be referred to as a "peer node" when the search peer 1264 is part of an indexer cluster. The search peer 1264, which may also be referred to as a search execution component, can be implemented using program code that can be executed on a computing device. In some implementations, one set of program code implements both the search head 1262 and the search peer 1264 such that the search head 1262 and the search peer 1264 form one component. In some implementations, the search head 1262 is an independent piece of code that performs searching and no indexing functionality. In these implementations, the search head 1262 may be referred to as a dedicated search head.

The search head 1262 may consider multiple criteria when determining whether to send the query 1266 to the particular search peer 1264. For example, the search system 1260 may be configured to include multiple search peers that each have duplicative copies of at least some of the event data and are implanted using different hardware resources q. In this example, the sending the search query 1266 to more than one search peer allows the search system 1260 to distribute the search workload across different hardware resources. As another example, search system 1260 may include different search peers for different purposes (e.g., one has an index storing a first type of data or from a first data source while a second has an index storing a second type of data or from a second data source). In this example, the search query 1266 may specify which indexes to search, and the search head 1262 will send the query 1266 to the search peers that have those indexes.

To identify events 1278 to send back to the search head 1262, the search peer 1264 performs a map process 1270 to obtain event data 1274 from the index 1238 that is maintained by the search peer 1264. During a first phase of the map process 1270, the search peer 1264 identifies buckets that have events that are described by the time indicator in the search query 1266. As noted above, a bucket contains events whose timestamps fall within a particular range of time. For each bucket 1244 whose events can be described by the time indicator, during a second phase of the map process 1270, the search peer 1264 performs a keyword search 1272 using search terms specified in the search query 1266. The search terms can be one or more of keywords, phrases, fields, Boolean expressions, and/or comparison expressions that in combination describe events being searched for. When segmentation is enabled at index time, the search peer 1264 performs the keyword search 1272 on the bucket's index file 1246. As noted previously, the index file 1246 includes a lexicon of the searchable terms in the events stored in the bucket's raw data 1248 file. The keyword search 1272 searches the lexicon for searchable terms that correspond to one or more of the search terms in the query 1266. As also noted above, the lexicon incudes, for each searchable term, a reference to each location in the raw data 1248 file where the searchable term can be found. Thus, when the keyword search identifies a searchable term in the index file 1246 that matches a search term in the query 1266, the search peer 1264 can use the location references to extract from the raw data 1248 file the event data 1274 for each event that include the searchable term.

In cases where segmentation was disabled at index time, the search peer 1264 performs the keyword search 1272 directly on the raw data 1248 file. To search the raw data 1248, the search peer 1264 may identify searchable segments in events in a similar manner as when the data was indexed. Thus, depending on how the search peer 1264 is configured, the search peer 1264 may look at event fields and/or parts of event fields to determine whether an event matches the query 1266. Any matching events can be added to the event data 1074 read from the raw data 1248 file. The search peer 1264 can further be configured to enable segmentation at search time, so that searching of the index 1238 causes the search peer 1264 to build a lexicon in the index file 1246.

The event data 1274 obtained from the raw data 1248 file includes the full text of each event found by the keyword search 1272. During a third phase of the map process 1270, the search peer 1264 performs event processing 1276 on the event data 1274, with the steps performed being determined by the configuration of the search peer 1264 and/or commands in the search query 1266. For example, the search peer 1264 can be configured to perform field discovery and field extraction. Field discovery is a process by which the search peer 1264 identifies and extracts key-value pairs from the events in the event data 1274. The search peer 1264 can, for example, be configured to automatically extract the first 100 fields (or another number of fields) in the event data 1274 that can be identified as key-value pairs. As another example, the search peer 1264 can extract any fields explicitly mentioned in the search query 1266. The search peer 1264 can, alternatively or additionally, be configured with particular field extractions to perform.

Other examples of steps that can be performed during event processing 1276 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1264 sends processed events 1278 to the search head 1262, which performs a reduce process 1280. The reduce process 1280 potentially receives events from multiple search peers and performs various results processing 1282 steps on the received events. The results processing 1282 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1282 can further include applying commands from the search query 1266 to the events. The query 1266 can include, for example, commands for evaluating and/or manipulating fields (e.g., to generate new fields from existing fields or parse fields that have more than one value). As another example, the query 1266 can include commands for calculating statistics over the events, such as counts of the occurrences of fields, or sums, averages, ranges, and so on, of field values. As another example, the query 1266 can include commands for generating statistical values for purposes of generating charts of graphs of the events.

The reduce process 1280 outputs the events found by the search query 1266, as well as information about the events. The search head 1262 transmits the events and the information about the events as search results 1268, which are received by the search and reporting app 1216. The search and reporting app 1216 can generate visual interfaces for viewing the search results 1268. The search and reporting app 1216 can, for example, output visual interfaces for the network access application 1206 running on a computing device 1204 to generate.

The visual interfaces can include various visualizations of the search results 1268, such as tables, line or area charts, Chloropleth maps, or single values. The search and reporting app 1216 can organize the visualizations into a dashboard, where the dashboard includes a panel for each visualization. A dashboard can thus include, for example, a panel listing the raw event data for the events in the search results 1268, a panel listing fields extracted at index time and/or found through field discovery along with statistics for those fields, and/or a timeline chart indicating how many events occurred at specific points in time (as indicated by the timestamps associated with each event). In various implementations, the search and reporting app 1216 can provide one or more default dashboards. Alternatively or additionally, the search and reporting app 1216 can include functionality that enables a user to configure custom dashboards.

The search and reporting app 1216 can also enable further investigation into the events in the search results 1268. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1266. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 13:
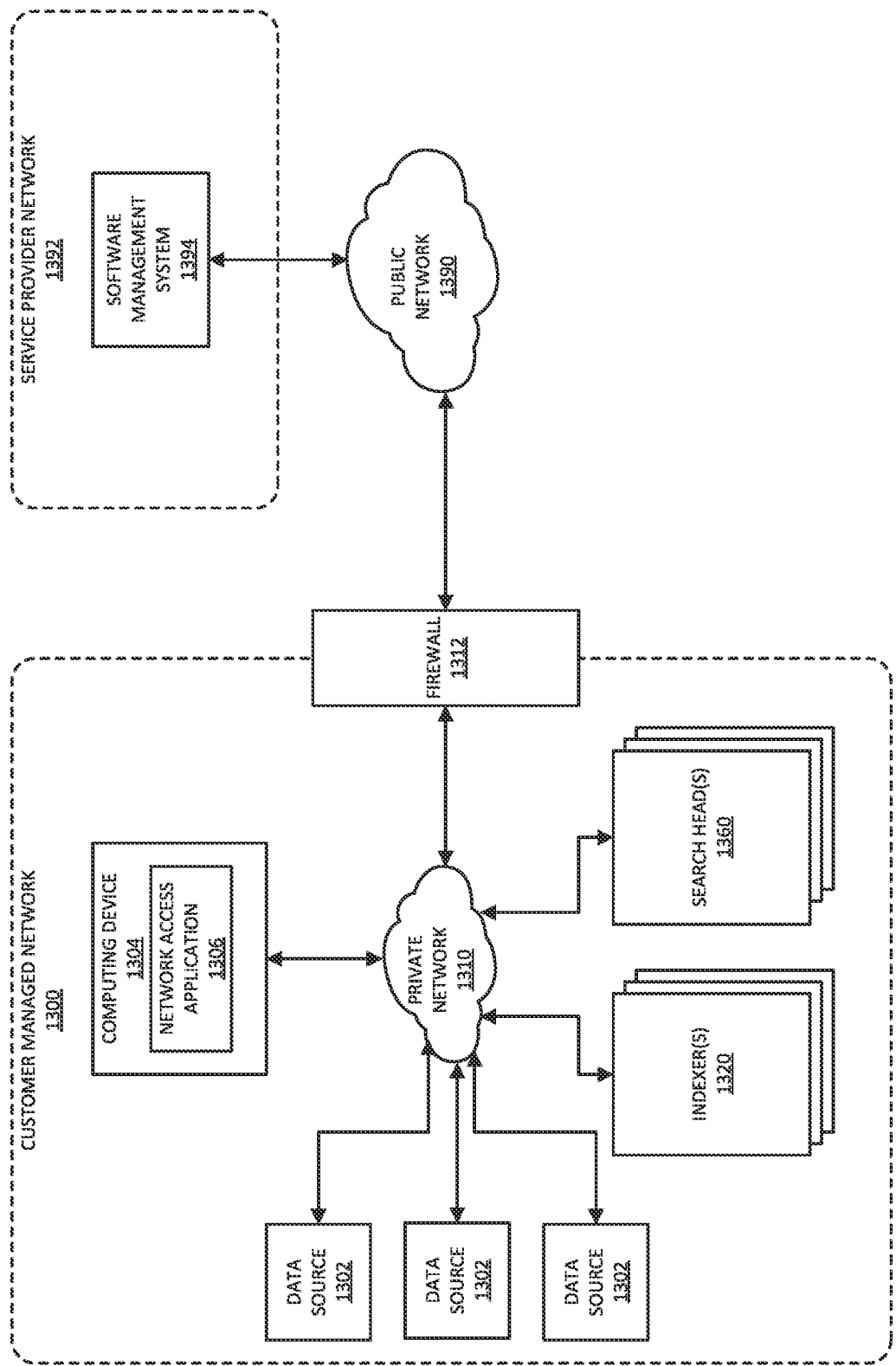
FIG. 13 illustrates an example diagram of an on premises data intake and query system in which FIG. 1 may be implemented.

FIG. 13 illustrates an example of a self-managed network 1300 that includes a data intake and query system. "Self-managed" in this instance means that the entity that is operating the self-managed network 1300 configures, administers, maintains, and/or operates the data intake and query system using its own compute resources and people. Further, the self-managed network 1300 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1300 is located within the customer's on-prem environment, such as in the entity's data center, the operation and management of the self-managed network 1300, including of the resources in the self-managed network 1300, is under the control of the entity. For example, administrative personnel of the entity have complete access to and control over the configuration, management, and security of the self-managed network 1300 and its resources.

The self-managed network 1300 can execute one or more instances of the data intake and query system. An instance of the data intake and query system may be executed by one or more computing devices that are part of the self-managed network 1300. A data intake and query system instance can comprise an indexing system and a search system, where the indexing system includes one or more indexers 1320 and the search system includes one or more search heads 1360.

As depicted in FIG. 13, the self-managed network 1300 can include one or more data sources 1302. Data received from these data sources may be processed by an instance of the data intake and query system within self-managed network 1300. The data sources 1302 and the data intake and query system instance can be communicatively coupled to each other via a private network 1310.

Users associated with the entity can interact with and avail themselves of the functions performed by a data intake and query system instance using computing devices. As depicted in FIG. 13, a computing device 1304 can execute a network access application 1306 (e.g., a web browser), that can communicate with the data intake and query system instance and with data sources 1302 via the private network 1310. Using the computing device 1304, a user can perform various operations with respect to the data intake and query system, such as management and administration of the data intake and query system, generation of knowledge objects, and other functions. Results generated from processing performed by the data intake and query system instance may be communicated to the computing device 1304 and output to the user via an output system (e.g., a screen) of the computing device 1304.

The self-managed network 1300 can also be connected to other networks that are outside the entity's on-premises environment/network, such as networks outside the entity's data center. Connectivity to these other external networks is controlled and regulated through one or more layers of security provided by the self-managed network 1300. One or more of these security layers can be implemented using firewalls 1312. The firewalls 1312 form a layer of security around the self-managed network 1300 and regulate the transmission of traffic from the self-managed network 1300 to the other networks and from these other networks to the self-managed network 1300.

Networks external to the self-managed network can include various types of networks including public networks 1390, other private networks, and/or cloud networks provided by one or more cloud service providers. An example of a public network 1390 is the Internet. In the example depicted in FIG. 13, the self-managed network 1300 is connected to a service provider network 1392 provided by a cloud service provider via the public network 1390.

In some implementations, resources provided by a cloud service provider may be used to facilitate the configuration and management of resources within the self-managed network 1300. For example, configuration and management of a data intake and query system instance in the self-managed network 1300 may be facilitated by a software management system 1394 operating in the service provider network 1392. There are various ways in which the software management system 1394 can facilitate the configuration and management of a data intake and query system instance within the self-managed network 1300. As one example, the software management system 1394 may facilitate the download of software including software updates for the data intake and query system. In this example, the software management system 1394 may store information indicative of the versions of the various data intake and query system instances present in the self-managed network 1300. When a software patch or upgrade is available for an instance, the software management system 1394 may inform the self-managed network 1300 of the patch or upgrade. This can be done via messages communicated from the software management system 1394 to the self-managed network 1300.

The software management system 1394 may also provide simplified ways for the patches and/or upgrades to be downloaded and applied to the self-managed network 1300. For example, a message communicated from the software management system 1394 to the self-managed network 1300 regarding a software upgrade may include a Uniform Resource Identifier (URI) that can be used by a system administrator of the self-managed network 1300 to download the upgrade to the self-managed network 1300. In this manner, management resources provided by a cloud service provider using the service provider network 1392 and which are located outside the self-managed network 1300 can be used to facilitate the configuration and management of one or more resources within the entity's on-prem environment. In some implementations, the download of the upgrades and patches may be automated, whereby the software management system 1394 is authorized to, upon determining that a patch is applicable to a data intake and query system instance inside the self-managed network 1300, automatically communicate the upgrade or patch to self-managed network 1300 and cause it to be installed within self-managed network 1300.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
receiving, by a computing device, an ingest preview request to preview events being received from at least one data source and to be stored by at least one indexer, the ingest preview request comprising request parameters,
  wherein the events are discrete portions of machine data associated with a timestamp, and
  wherein the request parameters define a type of the at least one data source that generates matching events to the ingest preview request, a set of field values of fields in matching events that match the ingest preview request, and a first number of events to return responsive to the ingest preview request;
generating, by the computing device, a subscription request for sending to a plurality of forwarders, wherein the subscription request comprises subscription parameters defining the type of the at least one data source and the set of field values identified in the ingest preview request, and wherein generating the subscription request further comprises:
  determining, from the first number of events and a number of the plurality of forwarders to send the subscription request, a second number of events to return responsive to the subscription request, wherein the second number of events is less than the first number of events, and
  specifying the second number of events in the subscription parameters in the subscription request;
sending, by the computing device, the subscription request to the plurality of forwarders,
  wherein the plurality of forwarders forwards the events from the at least one data source to the at least one indexer;
receiving, by a forwarder of the plurality of forwarders from the computing device, the subscription request for a sample set of the events;
identifying the subscription parameters from the subscription request;
intercepting, by the forwarder, a plurality of events being forwarded to the at least one indexer to obtain intercepted events, wherein the plurality of events is intercepted prior to being forwarded to the at least one indexer;
selecting, by the forwarder, a subset of the intercepted events, wherein the subset of the intercepted events are events from the type of the at least one data source as defined by the subscription request and have the set of field values as defined by the subscription request, and wherein the subset of the intercepted events is the sample set of events, and wherein the forwarder stops intercepting and selecting the subset of events when the subset of events satisfies the second number of events;
sending, by the forwarder, the sample set of events to the computing device;
adding, by the computing device to a dispatch directory, the sample set of events received from the plurality of forwarders until the sample set of events satisfies the first number of events; and
populating, responsive to the ingest preview request, a user interface with the sample set of events in the dispatch directory.

2. The method of claim 1, further comprising:
selecting a subset of the plurality of forwarders to process the subscription request to obtain a plurality of selected forwarders,
wherein the subscription request is sent to only the subset of the plurality of forwarders, and
wherein the sample set of events is received from only the subset of the plurality of forwarders.

3. The method of claim 1, further comprising:
randomly selecting a subset of the plurality of forwarders to process the subscription request to obtain a plurality of selected forwarders,
wherein the subscription request is sent to only the subset of the plurality of forwarders, and
wherein the sample set of events is received from only the subset of the plurality of forwarders.

4. The method of claim 1, further comprising:
generating a search job in response to the receiving the ingest preview request,
generating, for the search job, the subscription request as an application programming interface call to each forwarder in at least a subset of the plurality of forwarders.

5. The method of claim 1, further comprising:
cloning, by the forwarder, the intercepted events matching the subscription parameters to obtain cloned events; and
sending the cloned events to the computing device as the sample set of events.

6. The method of claim 1, further comprising:
creating a subscription record for the subscription request; and
sending, using the subscription record, the sample set of events to the computing device based on the subscription record.

7. The method of claim 1, further comprising:
receiving the sample set of events from the plurality of forwarders in a comma separated value format.

8. The method of claim 1, further comprising:
receiving the sample set of events as an event stream from the plurality of forwarders.

9. The method of claim 1, further comprising:
for each event, parsing the event to identify a category of the event; and
marking the event in the user interface based on the category.

10. The method of claim 1, further comprising:
receiving the sample set of events as a plurality of event streams from the plurality of forwarders; and
appending the plurality of events to an end of the dispatch directory in an order of how the sample set of events are received.

11. The method of claim 1, further comprising:
receiving the sample set of events as a plurality of event streams from the plurality of forwarders; and
stopping a connection for the subscription request when a stop condition occurs.

12. The method of claim 1, further comprising:
receiving the sample set of events as a plurality of event streams from the plurality of forwarders; and
stopping a connection for the subscription request when at least one of an event count of the sample set of events satisfies a threshold and a timeout occurs.

13. The method of claim 1, wherein the receiving the ingest preview request and sending the subscription request is a deployment server that manages a configuration of the plurality of forwarders.

14. The method of claim 1, wherein the ingest preview request is a representational state transfer (REST) call, and the subscription request is a hypertext transfer protocol (HTTP) request.

15. The computer-implemented method of claim 1, wherein generating the subscription request further comprises specifying an output format, not defined in the ingest preview request, to the subscription parameters, wherein the forwarder sends the sample set of events in accordance with the output format.

16. A system, comprising:
a computing device configured to perform first operations comprising:
receiving an ingest preview request to preview events being received from at least one data source and to be stored by at least one indexer, the ingest preview request comprising request parameters,
wherein the events are discrete portions of machine data associated with a timestamp, and
wherein the request parameters define a type of the at least one data source that generates matching events to the ingest preview request, a set of field values of fields in matching events that match the ingest preview request, and a first number of events to return responsive to the ingest preview request,
generating, by the computing device, a subscription request for sending to a plurality of forwarders, wherein the subscription request comprises subscription parameters defining the type of the at least one data source and the set of field values identified in the ingest preview request, and wherein generating the subscription request further comprises:
determining, from the first number of events and a number of the plurality of forwarders to send the subscription request, a second number of events to return responsive to the subscription request, wherein the second number of events is less than the first number of events, and
specifying the second number of events in the subscription parameters in the subscription request,
sending the subscription request to the plurality of forwarders,
wherein the plurality of forwarders forwards the events from the at least one data source to the at least one indexer,
adding, to a dispatch directory, a sample set of events received from the plurality of forwarders until the sample set of events satisfies the first number of events, and
populating, responsive to the ingest preview request, a user interface with the sample set of events in the dispatch directory; and
a forwarder of the plurality of forwarders configured to perform second operations comprising:
receiving, from the computing device, the subscription request for the sample set of the events,
identifying the subscription parameters from the subscription request,
intercepting a plurality of events being forwarded to the at least one indexer to obtain intercepted events, wherein the plurality of events is intercepted prior to being forwarded to the at least one indexer,
selecting a subset of the intercepted events, wherein the subset of the intercepted events are events from the type of the at least one data source as defined by the subscription request and have the set of field values as defined by the subscription request, and
wherein the subset of the intercepted events is the sample set of events, and wherein the forwarder stops intercepting and selecting the subset of events when the subset of events satisfies the second number of events, and
sending the sample set of events to the computing device.

17. The computing device of claim 16, the first operations further comprising:
selecting a subset of the plurality of forwarders to process the subscription request to obtain a plurality of selected forwarders,
wherein the subscription request is sent to only the subset of the plurality of forwarders, and
wherein the sample set of events is received from only the subset of the plurality of forwarders.

18. The computing device of claim 16, the first operations further comprising:
generating a search job in response to the receiving the ingest preview request,
generating, for the search job, the subscription request as an application programming interface call to each forwarder in at least a subset of the plurality of forwarders.

19. At least one non-transitory computer-readable medium having stored thereon instructions that, when executed by one or more processors, cause the one or more processors to perform operations including:
receiving, by a computing device, an ingest preview request to preview events being received from at least one data source and to be stored by at least one indexer, the ingest preview request comprising request parameters,
wherein the events are discrete portions of machine data associated with a timestamp, and
wherein the request parameters define a type of the at least one data source that generates matching events to the ingest preview request, a set of field values of fields in matching events that match the ingest preview request, and a first number of events to return responsive to the ingest preview request;
generating, by the computing device, a subscription request for sending to a plurality of forwarders, wherein the subscription request comprises subscription parameters defining the type of the at least one data source and the set of field values identified in the ingest preview request, and wherein generating the subscription request further comprises:
determining, from the first number of events and a number of the plurality of forwarders to send the subscription request, a second number of events to return responsive to the subscription request, wherein the second number of events is less than the first number of events, and
specifying the second number of events in the subscription parameters in the subscription request;
sending, by the computing device, the subscription request to the plurality of forwarders,
wherein the plurality of forwarders forwards the events from the at least one data source to the at least one indexer;

receiving, by a forwarder of the plurality of forwarders from the computing device, the subscription request for a sample set of the events;

identifying the subscription parameters from the subscription request;

intercepting, by the forwarder, a plurality of events being forwarded to the at least one indexer to obtain intercepted events, wherein the plurality of events is intercepted prior to being forwarded to the at least one indexer;

selecting, by the forwarder, a subset of the intercepted events, wherein the subset of the intercepted events are events from the type of the at least one data source as defined by the subscription request and have the set of field values as defined by the subscription request, and wherein the subset of the intercepted events is the sample set of events, and wherein the forwarder stops intercepting and selecting the subset of events when the subset of events satisfies the second number of events;

sending, by the forwarder, the sample set of events to the computing device;

adding, by the computing device to a dispatch directory, the sample set of events received from the plurality of forwarders until the sample set of events satisfies the first number of events; and populating, responsive to the ingest preview request, a user interface with the sample set of events in the dispatch directory.

20. The non-transitory computer-readable medium of claim 19, the operations further comprising:

selecting a subset of the plurality of forwarders to process the subscription request to obtain a plurality of selected forwarders, wherein the subscription request is sent to only the subset of the plurality of forwarders, and wherein the sample set of events is received from only the subset of the plurality of forwarders.

* * * * *